(12) United States Patent
Mattson et al.

(10) Patent No.: US 10,326,790 B2
(45) Date of Patent: Jun. 18, 2019

(54) REVERSE PROXY COMPUTER: DEPLOYING COUNTERMEASURES IN RESPONSE TO DETECTING AN AUTONOMOUS BROWSER EXECUTING ON A CLIENT COMPUTER

(71) Applicant: Shape Security, Inc., Palo Alto, CA (US)

(72) Inventors: Eli Mattson, San Francisco, CA (US); Carl Schroeder, Mountain View, CA (US); Bei Zhang, Mountain View, CA (US); Sergey Shekyan, Mountain View, CA (US); Salman Saghafi, Mountain View, CA (US); Jarrod Overson, Mountain View, CA (US); Lewis Ellis, Mountain View, CA (US)

(73) Assignee: Shape Security, Inc.

( * ) Notice: Subject to any disclaimer, the term of this patent is extended or adjusted under 35 U.S.C. 154(b) by 81 days.

(21) Appl. No.: 15/430,224

(22) Filed: Feb. 10, 2017

(65) Prior Publication Data

US 2017/0237766 A1      Aug. 17, 2017

Related U.S. Application Data

(60) Provisional application No. 62/294,981, filed on Feb. 12, 2016.

(51) Int. Cl.
*H04L 29/06* (2006.01)
*G06F 21/60* (2013.01)

(52) U.S. Cl.
CPC .......... *H04L 63/1441* (2013.01); *G06F 21/60* (2013.01); *G06F 2221/2103* (2013.01); *G06F 2221/2133* (2013.01); *H04L 2463/144* (2013.01)

(58) Field of Classification Search
CPC ............ H04L 63/1416; H04L 63/1425; H04L 63/1441; H04L 63/1433; H04L 2463/144;
(Continued)

(56) References Cited

U.S. PATENT DOCUMENTS 6,654,707 B2   11/2003   Wynn et al.
7,107,347 B1    9/2006   Cohen
(Continued)

FOREIGN PATENT DOCUMENTS

CN          101471818       5/2011
WO        WO2008/095018     8/2008
(Continued)

OTHER PUBLICATIONS

CTNF, dated Mar. 9, 2017, re: Siying Yang, U.S. Appl. No. 14/925,547, filed Oct. 28, 2015.
(Continued)

*Primary Examiner* — Hosuk Song
(74) *Attorney, Agent, or Firm* — Wei & Sleman LLP

(57) ABSTRACT

A computer system configured to improve security of server computers interacting with client computers, the system comprising: one or more processors executing instructions that cause the one or more processors to: select, from the plurality of detection tests, one or more first detection tests to be performed by a client computer; send, to the client computer, a first set of detection instructions that define the one or more first detection tests, and which when executed causes generating a first set of results that identifies a first set of characteristics of the client computer; receive the first set of results from the client computer; select one or more first countermeasures from a plurality of countermeasures based on the first set of characteristics identified in the first set of
(Continued)

results; send, to the client computer, a first set of countermeasure instructions that define the one or more first countermeasures.

16 Claims, 7 Drawing Sheets

(58) Field of Classification Search
CPC ............ G06F 21/60; G06F 2221/2103; G06F 2221/2133
USPC .................................................... 726/22–25
See application file for complete search history.

(56) References Cited

U.S. PATENT DOCUMENTS

| | | | |
|---|---|---|---|
| 7,398,553 B1 | 7/2008 | Li | |
| 7,424,720 B2 | 9/2008 | Chagoly | |
| 7,526,808 B2* | 4/2009 | Lynn | H04L 41/0893 380/255 |
| 7,849,502 B1 | 12/2010 | Bloch et al. | |
| 7,854,003 B1* | 12/2010 | Strayer | H04L 63/1433 726/23 |
| 7,870,610 B1 | 1/2011 | Mitchell et al. | |
| 8,195,953 B1 | 6/2012 | Yue et al. | |
| 8,326,881 B2* | 12/2012 | Zuk | H04L 63/1425 707/791 |
| 8,578,499 B1 | 11/2013 | Zhu et al. | |
| 8,650,648 B2 | 2/2014 | Howard et al. | |
| 8,713,684 B2 | 4/2014 | Bettini | |
| 8,726,394 B2* | 5/2014 | Maor | G06F 11/3688 717/124 |
| 8,739,284 B1 | 5/2014 | Gardner | |
| 8,752,208 B2 | 6/2014 | Shulman et al. | |
| 8,843,820 B1 | 9/2014 | Kay et al. | |
| 8,849,985 B1 | 9/2014 | Colton et al. | |
| 8,997,226 B1 | 3/2015 | Call et al. | |
| 9,043,924 B2* | 5/2015 | Maor | G06F 11/3688 726/25 |
| 9,158,893 B2 | 10/2015 | Call et al. | |
| 9,225,729 B1 | 12/2015 | Moen et al. | |
| 9,225,737 B2 | 12/2015 | Call et al. | |
| 9,258,328 B2 | 2/2016 | Ibatullin et al. | |
| 9,456,050 B1 | 9/2016 | Lepeska | |
| 9,537,888 B1 | 1/2017 | McClintock et al. | |
| 9,609,006 B2 | 3/2017 | Call et al. | |
| 9,628,498 B1 | 4/2017 | Aziz et al. | |
| 9,639,699 B1 | 5/2017 | Kurupati | |
| 9,646,140 B2 | 5/2017 | Horadan | |
| 9,680,850 B2 | 6/2017 | Rapaport et al. | |
| 9,686,300 B1 | 6/2017 | Kurupati | |
| 9,705,902 B1 | 7/2017 | Call et al. | |
| 9,906,544 B1 | 2/2018 | Kurupati | |
| 10,165,004 B1 | 12/2018 | Mehta | |
| 2005/0108554 A1 | 5/2005 | Rubin | |
| 2005/0172338 A1 | 8/2005 | Sandu | |
| 2005/0198099 A1 | 9/2005 | Motsinger | |
| 2006/0101047 A1 | 5/2006 | Rice | |
| 2006/0174323 A1 | 8/2006 | Brown et al. | |
| 2006/0195588 A1 | 8/2006 | Pennington et al. | |
| 2006/0230288 A1 | 10/2006 | Fox | |
| 2007/0011295 A1 | 1/2007 | Hansen | |
| 2007/0088955 A1 | 4/2007 | Lee | |
| 2007/0234070 A1 | 10/2007 | Horning et al. | |
| 2008/0208785 A1 | 8/2008 | Trefler et al. | |
| 2008/0320567 A1 | 12/2008 | Shulman et al. | |
| 2009/0199297 A1 | 8/2009 | Jarrett et al. | |
| 2009/0292791 A1 | 11/2009 | Livshits et al. | |
| 2010/0088404 A1 | 4/2010 | Mani | |
| 2010/0106611 A1 | 4/2010 | Paulsen | |
| 2010/0142382 A1 | 6/2010 | Jungck et al. | |
| 2010/0186089 A1 | 7/2010 | Fu et al. | |
| 2010/0218253 A1 | 8/2010 | Sutton et al. | |
| 2010/0287132 A1 | 11/2010 | Hauser | |
| 2011/0035733 A1 | 2/2011 | Horning et al. | |
| 2011/0225234 A1 | 9/2011 | Amit et al. | |
| 2011/0231305 A1 | 9/2011 | Winters | |
| 2012/0036576 A1 | 2/2012 | Iyer | |
| 2012/0090030 A1 | 4/2012 | Rapaport et al. | |
| 2012/0254727 A1 | 10/2012 | Jain | |
| 2012/0255006 A1 | 10/2012 | Aly et al. | |
| 2012/0324236 A1 | 12/2012 | Srivastava et al. | |
| 2013/0047255 A1 | 2/2013 | Dalcher | |
| 2013/0086679 A1 | 4/2013 | Beiter | |
| 2013/0219492 A1 | 8/2013 | Call et al. | |
| 2013/0273882 A1 | 10/2013 | Walsh | |
| 2014/0040051 A1 | 2/2014 | Ovick | |
| 2014/0096194 A1 | 4/2014 | Bhogavilli et al. | |
| 2014/0208198 A1 | 7/2014 | Ayoub et al. | |
| 2014/0298469 A1 | 10/2014 | Marion et al. | |
| 2014/0304816 A1 | 10/2014 | Klein et al. | |
| 2014/0310392 A1 | 10/2014 | Ho | |
| 2015/0067031 A1 | 3/2015 | Acharya | |
| 2015/0067866 A1 | 3/2015 | Ibatullin et al. | |
| 2015/0112892 A1 | 4/2015 | Kaminsky et al. | |
| 2015/0262183 A1 | 9/2015 | Gervais | |
| 2015/0278491 A1 | 10/2015 | Horning et al. | |
| 2015/0281263 A1 | 10/2015 | McLaughlin et al. | |
| 2015/0358338 A1 | 12/2015 | Zeitlin et al. | |
| 2015/0379266 A1 | 12/2015 | McLaughlin et al. | |
| 2016/0005029 A1 | 1/2016 | Ivey | |
| 2016/0072829 A1 | 3/2016 | Call et al. | |
| 2016/0119344 A1 | 4/2016 | Freitas Fortuna dos Santos et al. | |
| 2016/0342793 A1 | 11/2016 | Hidayat | |
| 2016/0344769 A1 | 11/2016 | Li | |
| 2016/0378989 A1 | 12/2016 | Park | |
| 2017/0012960 A1 | 1/2017 | Idika | |
| 2017/0013012 A1 | 1/2017 | Hansen | |
| 2017/0048260 A1 | 2/2017 | Peddemors et al. | |
| 2017/0201540 A1 | 7/2017 | Call | |
| 2017/0235954 A1 | 8/2017 | Kurupati | |
| 2017/0237766 A1 | 8/2017 | Mattson | |
| 2017/0257383 A1 | 9/2017 | Ficarra | |
| 2017/0257385 A1 | 9/2017 | Overson | |
| 2017/0293748 A1 | 10/2017 | Kurupati | |
| 2018/0205747 A1 | 7/2018 | Ficarra | |
| 2018/0255154 A1 | 9/2018 | Li | |

FOREIGN PATENT DOCUMENTS

| | | |
|---|---|---|
| WO | WO2008/095031 | 8/2008 |
| WO | WO2008/130946 | 10/2008 |
| WO | WO 2017/007705 | 1/2017 |
| WO | WO 2017/007936 | 1/2017 |
| WO | WO 2017/074622 | 5/2017 |

OTHER PUBLICATIONS

NOA, dated Apr. 23, 2015, re: Justin Call, U.S. Appl. No. 13/527,025, filed Jun. 19, 2012.
CTFR, dated Feb. 10, 2015, re: Justin Call, U.S. Appl. No. 13/527,025, filed Jun. 19, 2012.
CTNF, dated Nov. 2, 2012, re: Justin Call, U.S. Appl. No. 13/527,025, filed Jun. 19, 2012.
CTFR, dated Apr. 23, 2013, re: Justin Call, U.S. Appl. No. 13/527,025, filed Jun. 19, 2012.
CTNF, dated Aug. 4, 2014, re: Justin Call, U.S. Appl. No. 13/527,025, filed Jun. 19, 2012.
NOA, dated Jun. 1, 2015, re: Justin Call, U.S. Appl. No. 13/527,025, filed Jun. 19, 2012.
CTNF, dated Feb. 26, 2015, re: Justin Call, U.S. Appl. No. 14/055,576, filed Oct. 16, 2013.
NOA, dated Aug. 21, 2015, re: Justin Call, U.S. Appl. No. 14/055,576, filed Oct. 16, 2013.
CTNF, dated May 20, 2015, re: Justin Call, U.S. Appl. No. 14/110,659, filed Oct. 8, 2013.
NOA, dated Aug. 19, 2015, re: Daniel Moen, U.S. Appl. No. 14/160,107, filed Jan. 21, 2014.
CTNF, dated Jun. 27, 2014, re: Justin Call, U.S. Appl. No. 14/255,248, filed Apr. 17, 2014.
NOA, dated Nov. 19, 2014, re: Justin Call, U.S. Appl. No. 14/255,248, filed Apr. 17, 2014.

(56) References Cited

OTHER PUBLICATIONS

NOA, dated Dec. 24, 2014, re: Justin Call, U.S. Appl. No. 14/255,248, filed Apr. 17, 2014.
CTNF, dated Sep. 1, 2015, re: Ariya Hidayat, U.S. Appl. No. 14/293,895, filed Jun. 2, 2014.
NOA, dated Mar. 30, 2016, re: Ariya Hidayat, U.S. Appl. No. 14/293,895, filed Jun. 2, 2014.
NOA, dated Jul. 21, 2016, re: Siying Yang, U.S. Appl. No. 14/541,062, filed Nov. 13, 2014.
CTNF, dated Feb. 23, 2016, re: Siying Yang, U.S. Appl. No. 14/541,062, filed Nov. 13, 2014.
CTNF, dated May 8, 2015, re: Timothy Peacock, U.S. Appl. No. 14/570,632, filed Dec. 15, 2014.
NOA, dated Dec. 18, 2015, re: Timothy Peacock, U.S. Appl. No. 14/570,632, filed Dec. 15, 2014.
CTNF, dated Mar. 17, 2016, re: Justin Call, U.S. Appl. No. 14/672,879, filed Mar. 30, 2015.
CTNF, dated Nov. 10, 2016, re: Nwokedi Idika, U.S. Appl. No. 14/728,621, filed Jun. 2, 2015.
CTNF, dated Mar. 14, 2016, re: Justin Call, U.S. Appl. No. 14/874,717, filed Oct. 5, 2015.
NOA, dated Apr. 28, 2016, re: Justin Call, U.S. Appl. No. 14/874,717, filed Oct. 5, 2015.
NOA, dated Nov. 16, 2016, re: Justin Call, U.S. Appl. No. 14/980,409, filed Dec. 28, 2015.
CTNF, dated Aug. 2, 2016, re: Justin Call, U.S. Appl. No. 14/980,409, filed Dec. 28, 2015.
CTFR, dated Nov. 18, 2016, re: Justin D. Call, U.S. Appl. No. 14/672,879, filed Mar. 30, 2015.
CTNF, dated Jun. 1, 2017, re: Siying Yang, U.S. Appl. No. 14/942,769, filed Nov. 16, 2015.
Detection and Analysis of Drive-by-Download Attacks and Malicious JavaScript Code, Apr. 26, 2010.
Defending Browsers against Drive-by Downloads: Mitigating Heap-spraying Code Injection Attacks, Jul. 9, 2009.
Intrusion Detection using Sequences of System calls, Aug. 18, 1998.
Recent Java exploitation trends and malware, Jul. 26, 2012.
DoDOM: Leveraging DOM Invariants for Web 2.0 Application Robustness Testing, Nov. 1, 2010.
Cujo: Efficient Detection and Prevention of Drive-by-Download Attacks, Dec. 6, 2010.
Design and Implementation of a Distributed Virtual Machine for Networked Computers, 1999.
International Search Report, dated Sep. 22, 2016, PCT/US16/40645.
International Search Report, dated Feb. 16, 2017, PCT/US16/53472.
International Search Report, dated Oct. 11, 2016, PCT/US16/41337.
International Search Report, dated Jul. 1, 2016, PCT/US16/25092.
International Search Report, dated Aug. 1, 2014, PCT/US14/24232.
International Search Report, dated Jun. 3, 2013, PCT/US13/26516.
CTFR, dated Nov. 30, 2018, re: Siying Yang, U.S. Appl. No. 14/925,547, filed Oct. 28, 2015.
NOA, dated Nov. 27, 2018, re: Nwokedi Idika, U.S. Appl. No. 15/204,710, filed Jul. 7, 2016.
CTNF, dated Oct. 5, 2018, re: Zhiwei Li, U.S. Appl. No. 15/968,573, filed May 1, 2018.
NOA, dated Sep. 12, 2018, re: Justin D. Call, U.S. Appl. No. 15/645,787, filed Jul. 10, 2017.
CTNF, dated Nov. 29, 2018, re: Jarrod S. Overson, U.S. Appl. No. 15/059,080, filed Mar. 2, 2016.
NOA, dated Jan. 3, 2019, re: Bei Zhang, U.S. Appl. No. 14/859,084, filed Sep. 18, 2015.
CTNF, dated Jun. 2, 2017, re: Ariya Hidayat, U.S. Appl. No. 15/224,978, filed Aug. 1, 2016.
CTNF, dated Apr. 7, 2017, re: Yao Zhao, U.S. Appl. No. 14/861,906, filed Sep. 22, 2015.
CTNF, dated May 25, 2017, re: Daniel G. Moen, U.S. Appl. No. 14/980,231, filed Dec. 28, 2015.
CTNF, dated Jul. 26, 2017, re: Bei Zhang, U.S. Appl. No. 14/859,084, filed Sep. 18, 2015.
CTNF, dated Jun. 21, 2017, re: Zhiwei Li, U.S. Appl. No. 14/718,736, filed May 21, 2015.
CTNF, dated Aug. 30, 2017, re: Justin D. Call, U.S. Appl. No. 15/470,715, filed Mar. 27, 2017.
CTFR, dated Sep. 5, 2017, re: Siying Yang, U.S. Appl. No. 14/925,547, filed Oct. 28, 2015.
CTNF, dated Oct. 19, 2017, re: Jarrod S. Overson, U.S. Appl. No. 15/059,080, filed Mar. 2, 2016.
NOA, dated Oct. 25, 2017, re: Michael J. Ficarra, U.S. Appl. No. 15/060,322, filed Mar. 3, 2016.
CTNF, dated Nov. 13, 2017, re: Nwokedi Idika, U.S. Appl. No. 14/728,596, filed Jun. 2, 2015.
CTNF, dated Dec. 13, 2017, re: Justin D. Call, U.S. Appl. No. 15/645,787, filed Jul. 10, 2017.
NOA, dated Dec. 18, 2017, re: Yao Zhao, U.S. Appl. No. 14/861,906, filed Sep. 22, 2015.
NOA, dated Jan. 5, 2018, re: Yao Zhao, U.S. Appl. No. 14/861,906, filed Sep. 22, 2015.
NOA, dated Jan. 9, 2018, re: Justin D. Call, U.S. Appl. No. 15/470,715, filed Mar. 27, 2017.
CTFR, dated Jan. 25, 2018, re: Siying Yang, U.S. Appl. No. 14/942,769, filed Nov. 16, 2015.
CTNF, dated Feb. 7, 2017, re: Daniel G. Moen, U.S. Appl. No. 14/980,231, filed Dec. 28, 2015.
CTFR, dated Jan. 10, 2018, re: Bei Zhang, U.S. Appl. No. 14/859,084, filed Sep. 18, 2015.
NOA, dated Jan. 25, 2018, re: Zhiwei Li, U.S. Appl. No. 14/718,736, filed May 21, 2015.
CTNF, dated Mar. 30, 2018, re: Michael J. Ficarra, U.S. Appl. No. 15/060,380, filed Mar. 3, 2016.
CTNF, dated Apr. 19, 2018, re: Michael J. Ficarra, U.S. Appl. No. 15/919,034, filed Mar. 12, 2018.
CTNF, dated May 5, 2018, re: Marc R. Hansen, U.S. Appl. No. 15/202,755, filed Jul. 6, 2016.
CTFR, dated May 10, 2018, re: Nwokedi Idika, U.S. Appl. No. 14/728,596, filed Jun. 2, 2015.
CTNF, dated Feb. 16, 2018, re: Siying Yang, U.S. Appl. No. 15/068,468, filed Mar. 11, 2016.
CTFR, dated May 17, 2018, re: Jarrod S. Overson, U.S. Appl. No. 15/059,080, filed Mar. 2, 2016.
CTNF, dated Jun. 7, 2018, re: Siying Yang, U.S. Appl. No. 14/925,547, filed Oct. 28, 2015.
CTNF, dated Jun. 29, 2018, re: Timothy Dylan Peacock, U.S. Appl. No. 15/137,824, filed Apr. 25, 2016.
CTNF, dated Feb. 1, 2018, re: Nwokedi Idika, U.S. Appl. No. 15/204,710, filed Jul. 7, 2016.
NOA, dated Aug. 13, 2018, re: Daniel G. Moen, U.S. Appl. No. 14/980,231, filed Dec. 28, 2015.
NOA, dated Sep. 5, 2018, re: Daniel G. Moen, U.S. Appl. No. 14/980,231, filed Dec. 28, 2015.
NOA, dated Sep. 17, 2018, re: Siying Yang, U.S. Appl. No. 14/942,769, filed Nov. 16, 2015.
NOA, dated Sep. 5, 2018, re: Michael J. Ficarra, U.S. Appl. No. 15/919,034, filed Mar. 12, 2018.
NOA, dated Jul. 5, 2018, re: Siying Yang, U.S. Appl. No. 15/068,468, filed Mar. 11, 2016.
NOA, dated Sep. 19, 2018, re: Nwokedi Idika, U.S. Appl. No. 15/204,710, filed Jul. 7, 2016.
CTNF, dated Sep. 19, 2018, re: Eli Mattson, U.S. Appl. No. 15/430,224, filed Feb. 10, 2017.
DuPaul, Neil, "Common Malware Types: Cybersecurity 101", Veracode, Oct. 12, 2012, 9 pages, Oct. 12, 2012.
Friendly Bit, "Rendering a web page—step by step", published Jan. 11, 2010, pp. 1-2, Jan. 11, 2010.
"Custom Elements: defining new elements in HTML", Dec. 8, 2013, 15 pages, Dec. 8, 2013.
CTFR, dated Sep. 11, 2018, re: Michael J. Ficarra, U.S. Appl. No. 15/060,380, filed Mar. 3, 2016.
CTFR, dated Nov. 1, 2018, re: Marc. R. Hansen, U.S. Appl. No. 15/202,755, filed Jul. 6, 2016.

(56) References Cited

OTHER PUBLICATIONS

CTNF, dated Nov. 13, 2017, re: Nowkedi Idika, U.S. Appl. No. 14/728,596, filed Jun. 2, 2015.
CTNF, dated May 15, 2018, re: Marc R. Hansen, U.S. Appl. No. 15/202,755, filed Jul. 6, 2016.
NOA, dated May 18, 2018, re: Siying Yang, U.S. Appl. No. 14/942,769, filed Nov. 16, 2015.
CTNF, dated May 23, 2018, re: Bei Zhang, U.S. Appl. No. 14/859,084, filed Sep. 18, 2015.
CTNF, dated Jun. 7, 2018, re: Siying Yang, U.S. Appl. No. 14/925,54, filed Oct. 28, 2015.
NOA, dated Feb. 7, 2019, re: Siying Yang, U.S. Appl. No. 16/190,015, filed Nov. 13, 2018.
CTNF, dated Jan. 24, 2019, re: Nwokedi Idika, U.S. Appl. No. 14/728,596, filed Jun. 2, 2015.
NOA, dated Feb. 6, 2019, re: Eli Mattson, U.S. Appl. No. 15/430,224, filed Feb. 10, 2017.
U.S. Appl. No. 16/190,015, dated Mar. 14, 2019, Sying Yang.

\* cited by examiner

REVERSE PROXY COMPUTER: DEPLOYING COUNTERMEASURES IN RESPONSE TO DETECTING AN AUTONOMOUS BROWSER EXECUTING ON A CLIENT COMPUTER

BENEFIT CLAIM

This application claims the benefit under 35 U.S.C. § 119(e) of provisional application 62/294,981, filed Feb. 12, 2016, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to security techniques applicable to client/server computer systems, and relates more specifically to techniques for detecting whether a client computer interacting with server computers through an intermediary computer is a headless or autonomous browser (also referred to a bot) or a browser operated by a legitimate user. SUGGESTED GROUP ART UNIT: 2447; SUGGESTED CLASSIFICATION: 709/217.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer programs that may request and execute instructions received from a web server to generate complex user interfaces that are presented to a user through one or more devices, such as a monitor or speakers. In response to input from a user indicating that the user selected an object defined in the instructions, a browser may send a request based on the selected object to the web server. The request may be a request for data or include data to be processed by the web server. For example, a browser may present a web page from a web server that defines a form, a user may enter data into one or more fields in the form, select a submit button. In response the browser may generate request that includes the data entered into the one or more fields, and send the request to the web server.

Attackers may use software, often referred to as a "bot" or "headless browser", which imitates a browser and a user by receiving instructions from a web server and autonomously generating requests based on those instructions. For example, a bot may receive a web page, gather data in one or more objects defined in the web page, and generate a request for another web page to gather additional data, as if a user using a browser was requesting a new web page. Also for example, a bot may generate and send a request with data assigned to one or more parameters that correspond to fields in a web page to simulate a user submitting data to a web server through a browser.

Attackers may use bots to commit many types of unauthorized acts, crimes or computer fraud, such as web site or content scraping, ratings manipulation, fake account creation, reserving rival goods attacks, credential stuffing attacks, password snooping, vulnerability assessments, brute force attacks, click fraud, DDoS attacks, bidding wars, and system fingerprinting attacks. As a specific example, a malicious user may cause a bot to traverse through pages of a web site and collect private or proprietary data, such as emails of all employees or prices of competitive products.

Web server administrators may wish to prevent malicious users from attacking the site, while allowing legitimate users to use the site as intended. However, determining which requests are generated by a legitimate user using a web browser and a malicious user using a bot may be difficult.

SUMMARY

The appended claims may serve as a summary of the invention.

Figure 1:
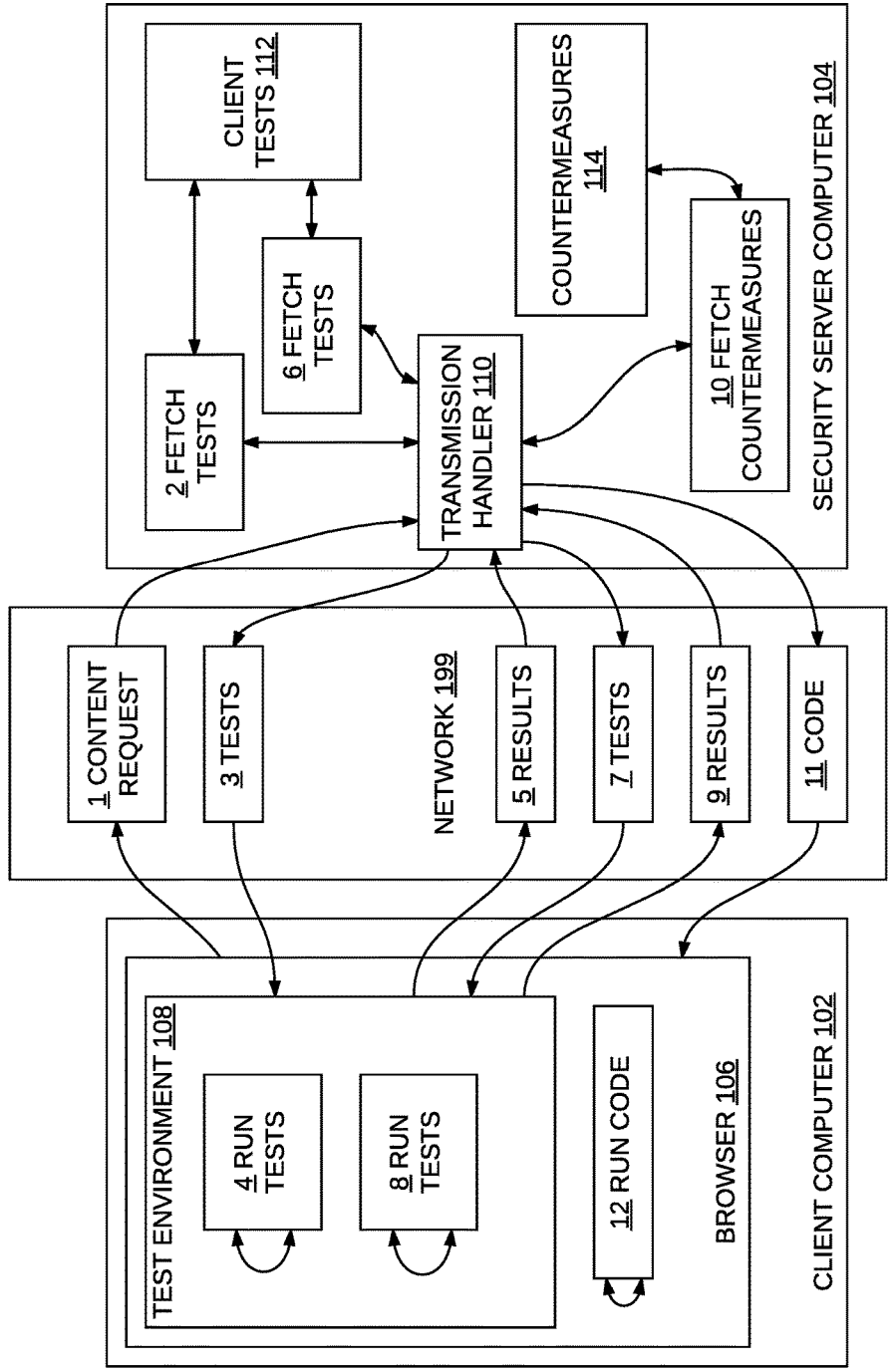
FIG. 1 illustrates a system for characterizing a client device, and selecting one or more countermeasures for a client device in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. Furthermore, while the instructions discussed in many example embodiments are HyperText Markup Language ("HTML") and JavaScript instructions, in other embodiments, the instructions intercepted and generated may be any other standard or proprietary instructions configured to be executed by a client computer.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Words, such as "or", may be inclusive or exclusive unless expressly stated otherwise; a "set" may comprise zero, one, or two or more elements. For example, a set of instructions may comprise one or more instructions. One or more of a first set of objects or a second set of objects may be one or more of the first set of objects or one or more of the second set of objects.

Embodiments discussed herein provide numerous benefits and improvements over the general idea of processing data from a client computer. The embodiments discussed here increase the resistance of server computers and database systems to computer attacks. For example, using the methods and system discussed herein, a server computer may detect or identify the browser, or type of browser, receiving a web page, processing the web page, and generating one or more requests based on the web page. A type of browser may include versions of a particular browser, one or more commercial browsers that are known to be legitimate, one or more browsers that are known to be legitimate bots (such as a search engine web crawler), one or more browsers that are known to be malicious bots, or any other set of browsers.

Embodiments are described herein according to the following outline:
1.0 General Overview
    1.1 Tests, Countermeasures, and Rules
    1.2 Signals
    1.3 Countermeasures
    1.4 Rules
    1.5 Security Server Computer System
2.0 Selecting Countermeasures
    2.1 Weighting Test Results or Signals
3.0 Example System and process for Selecting and Sending Tests and Countermeasures
    3.1 Transmission Handler
    3.2 Client Device
        3.2.1 Test Environment
    3.3 Example Process for Selecting One or More Tests or Countermeasures
        3.3.1 Selecting and Sending a First Set of Tests
        3.3.2 Receiving Signals from the First Set of Tests
        3.3.3 Selecting and Sending a Second Set of Tests based on the First Set of Tests
        3.3.4 Receiving Signals from the Second Set of Tests and Selecting a Set of Countermeasures
        3.3.5 Executing or Sending the Set of Countermeasures to the Client Computer
4.0 Configurations
    4.1 Passive or Reporting Mode
    4.2 Active Mode
    4.3 Real-Time Mode
    4.4 In-Band and Out of Band Configuration
5.0 Example Interactions between Client Computers and a Security Server Computer
6.0 Example Network Configuration
7.0 Example Process for Testing a Client Computer and Selecting Countermeasures
8.0 Example Network Configuration and Security Server Computers
9.0 Implementation Mechanisms—Hardware Overview
10.0 Other Aspects of Disclosure
1.0 General Overview In an embodiment, a computer system configured to improve security of one or more server computers interacting with one or more client computers, the system comprising: one or more processors; a memory coupled to the one or more processors and storing a set of instructions that define a plurality of detection tests and which, when executed by the one or more processors, cause the one or more processors to: select, from the plurality of detection tests, one or more first detection tests to be performed by a client computer; send, to the client computer, a first set of detection instructions that define the one or more first detection tests, and which when executed causes generating a first set of results that identifies a first set of characteristics of the client computer; receive the first set of results from the client computer; select one or more first countermeasures from a plurality of countermeasures based on the first set of characteristics identified in the first set of results; send, to the client computer, a first set of countermeasure instructions that define the one or more first countermeasures.

In an embodiment, the first set of characteristics indicates that the client computer is executing an instance of a particular browser; the one or more first countermeasures are targeted toward the particular browser; the one or more first countermeasures are associated with the particular browser; and the one or more first countermeasures are selected based on determining that the one or more first countermeasures are associated with the particular browser.

In an embodiment, the instructions, when executed, cause the one or more processors to: select, from the plurality of detection tests, one or more second detection tests to be performed by the client computer, wherein the one or more second detection tests are different than the one or more first detection tests; send, to the client computer, a second set of detection instructions that define the one or more second detection tests, and which when executed causes generating a second set of data that identifies a second set of characteristics of the client computer; receive the second set of data from the client computer; wherein selecting the one or more first countermeasures from the plurality of countermeasures is also based on the second set of data.

In an embodiment, a particular detection test among the one or more first detection tests is associated with the one or more second detection tests; the first set of results indicates a particular result based on the particular detection test; the one or more second detection tests are selected in response to determining that the first set of results included the particular result.

In an embodiment, the first set of results indicates that the client computer is executing an instance of a particular browser that matches one or more characteristics of a first browser and a second browser; wherein the computer system further comprises instructions which when executed cause the one or more processors to: select, from the plurality of detection tests, one or more second detection tests to be performed by the client computer, wherein the one or more second detection tests are associated with the first browser and the second browser, and the one or more second detection tests are different than the one or more first detection tests; send, to the client computer, a second set of detection instructions that define the one or more second detection tests, and which when executed causes generating a second set of data that identifies a second set of characteristics of the client computer; receive, from the client computer, the second set of data that identify the second set of characteristics; determine, from the second set of characteristics, that the particular browser that is being executed by the client computer is the first browser and not the second browser; determine that the one or more first countermeasures are associated with the first browser; wherein selecting the one or more first countermeasures from the plurality of countermeasures is based on determining that the one or more first countermeasures are associated with the first browser.

A "computer" or "device" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

1.1 Tests, Countermeasures, and Rules

Systems, methods, devices, and techniques for causing tests to be performed by, or implementing countermeasures against, client computing devices that request resources, such as web page resources, are discussed herein. The test results from a client device may characterize capabilities and characteristics of the client device. Test results may also be referred to herein as signals. Security countermeasures may be applied to code served to the client device based on analysis of the signals generated by, and returned from, the client device.

Signals may be received over multiple requests from a client device that performed the tests or generated the signals. For example, a first set or round of one or more tests may be sent to a client device. The client device may execute the one or more tests to produce a first set of one or more test results or signals. The client device may send, and a security server computer system may receive, the first set of test results or signals. The security server computer system may use those signals to select one or more additional tests to be sent to the client device. Accordingly, the client device may execute the one or more additional tests to produce a second set of one or more test results or signals. The client device may send, and a security server computer system may receive, the second set of test results or signals. The signals returned from the two rounds of testing may then be used to select one or more countermeasures to apply against the client device. Additionally, or alternatively, the signals may be analyzed alone or in aggregation with signals received from many other clients to better select and develop countermeasures that can be deployed in the future to protect the web site that served the initial resources or other web sites.

1.2 Tests

A test may comprise a one or more computer or browser executable instructions. For example, a test may comprise one or more detection instructions discussed in U.S. application Ser. No. 14/859,084, filed Sep. 18, 2015, and U.S. Provisional Application 62/053,022, filed Sep. 19, 2014, each of which is hereby incorporated by reference for all purposes as if fully set forth herein. Detection instructions may also be referred to herein as test code. The detection instructions may be written in JavaScript, HTML, or one or more other standard or proprietary languages that may be executed by a browser, execution environment, or computer processor. Tests may request additional resources, such as images, style sheets, or additional tests, to collect the signals enumerated herein or one or more other signals.

1.3 Signals

A signal or test result may be one or more values that are generated in response to executing or performing a test. For example, a signal may comprise data discussed in U.S. application Ser. No. 14/859,084, filed Sep. 18, 2015, and U.S. Provisional Application 62/053,022, filed Sep. 19, 2014, each of which is hereby incorporated by reference for all purposes as if fully set forth herein. One or more signals may be sent to a security server computer system using one or more requests. The one or more requests may comprise one or more requests for additional data, such as a web page, or one or more requests that are sent asynchronously or separately from one or more requests for additional data. Signals can include one or more of the following properties of the browser: user-agent, computing endpoint identifier, network identifier, user identifier.

1.4 Countermeasures

A countermeasure may comprise a one or more computer or browser executable instructions. For example, a countermeasure may comprise one or more countermeasure instructions discussed in U.S. application Ser. No. 14/859,084, filed Sep. 18, 2015, and U.S. Provisional Application 62/053,022, filed Sep. 19, 2014, each of which is hereby incorporated by reference for all purposes as if fully set forth herein. Countermeasure instructions may also be referred to herein as countermeasure code. The countermeasure instructions may be written in JavaScript, HTML, or one or more other standard or proprietary languages that may be executed by a browser, execution environment, or computer processor.

A countermeasure may be another test that is more computationally expensive. For example, a countermeasure may execute a computationally expensive proof of work operation in the background as the user does so, to prevent a near instantaneous follow-up by the client computer in case the client computer happens to be operated by a bot that has been instructed to take part on a DoS attack. A countermeasure may be a response with an HTTP error. Another countermeasure may take the form input and encode or encrypt it so that it cannot be altered or intercepted. For example, the countermeasure may present a field in a form as a number of spatially overlapping fields that are offset from each other by one character, so that as the user types input, each character is received by a successive field while looking to the user like all the characters are being placed in a single long field. The countermeasure may then scramble the order of the characters before sending them back to the security intermediary (which may further process the submitted communication before passing it onto the origin server computer).

1.5 Rules

Rules, like tests or countermeasures, may be discrete or composed by a user. For example, a user or system administrator may define rules in a script or markup language. Rules may specify both how to classify requests, or client computers that send requests, as well as the action to take in response to one or more signals or properties of a client computer, software on the client computer, a request, a content server computer, or the security server computer.

1.6 Security Server Computer System

The security server computer system may comprise one or more server computers, or software that is executed on one or more server computers. The security server computer system may comprise a security intermediary that resides physically and/or logically between an origin server computer system and the Internet, or the origin server computer system and one or more client devices, may generate or send the client-side tests, evaluate the signals generated from the tests, and select security countermeasures or perform additional analysis based on the signals.

The security server computer system may be provided by a security company to a separate company that provides a web site or application via a web or content server computer system comprising to its customers, such as a bank, retailer, or other such company. The web or content server computer system may comprise one or more server computers. For convenience of expression the separate company may be referred to herein as the application company. The content server computers may come under attack from illegitimate parties that want to interfere with the application company through a denial of service ("DoS") attack or other attacks. Illegitimate parties may want to obtain information from the application company or application company's customers for nefarious purposes, such as stealing money from the separate company's electronic accounts, or the separate company's customers' electronic accounts.

In one or more of the examples discussed herein, the security server computer system may be an intermediary that intercepts communications from the origin server computer system to client devices in order to insert security countermeasures that would frustrate efforts by attackers. The security server computer system may likewise intercept communications from client devices to the origin server computer system. For example, the security server computer system may be a proxy for the origin server computer system, which may isolate the origin server computer system from attacks in one or more requests. If the requests would look unfamiliar to the origin server computer system because of changes the security server computer system may have made to code that the origin server computer system had earlier served, then the security server computer system may translate the requests so that they are usable by the origin server computer system.

In some implementations, a company that provides web services may conveniently add a layer of security in front of its server computer system (also referred to herein as origin server computer system), over the content that it delivers to requesting clients, and in front of demands imposed by those clients. Such addition may occur with no or minimal effect or reprogramming/reconfiguration of the underlying origin server computer system of the company. Also, the security may be flexible and dynamic, in that it can be targeted to the particular characteristics of a particular requesting client, and can also change as threats change, even as they change very rapidly across a large group of users. Moreover, data for identifying threats can be aggregated by a security service provider across many of its clients so that new threats can be identified more quickly and accurately, by analyzing signals submitted from a large number of different client devices that have been served content from a large number of different organizations, and dealt with before they become a real problem.

Some implementations described herein can include a computer-implemented method. The method can include receiving at a security server computer system a request for web resources from a client computer; selecting, from a plurality of available tests, one or more particular tests to be performed by the client computer on itself, wherein each of the available tests comprise a series of operations to be performed to identify characteristics of the client computer; serving, from the security server computer system to the client computer, code for performing the selected one or more particular tests and code for reporting results of performing the one or more particular tests; and based on received signals from performing the one or more particular tests by the client computer, selecting from a plurality of available security countermeasures, one or more particular security countermeasures; and serving the requested web resources to the client computer with the selected security countermeasures applied.

The method can also comprise analyzing the received signals from performing the one or more particular tests; and serving, from the security server computer system to the client computer, code for performing one or more follow-up tests that are selected based on the analyzing, wherein the plurality of security countermeasures is selected based on the receiving signals form performing the one or more particular tests and received signals from performing the one or more follow-up tests. The one or more tests may also comprise seeking user input from a user of the client computer, and the signals from performing the one or more tests comprise signals that indicate whether a human user provided input. And the signals may indicate whether the client computer was physically moved while the input was received. Moreover, the signals from performing the one or more tests can be packaged by a transmission handler that is configured to obtain signals from multiple independent tests performed on the client computer and to encode the signals to protect the signals from outside interference.

2.0 Selecting Countermeasures

A security server computer system may select one or more particular countermeasures that are targeted to characteristics of a particular client device that is requesting content. The characteristics of the particular client device may be determined from signals received from the particular client device as discussed herein.

The signals may be used to determine whether the device is operated by a human operator or by a bot. For example, a first test may seek user input on a client device; the code for executing the test may present an input field on the client device and may obtain motion data of the device when an actual human user inputs data into the input field. If the device has been identified as a putative, legitimate, or actual user using a client device, but signals from the test indicate that motion data was not collected when data is entered into the input field, then the security server computer system may determine that the client device is not currently being operated by a human user whose physical input would likely cause the device to move as characters displayed on the device are tapped. Additionally, or alternatively, in response to receiving the signal(s) from the first test indicating that the client device was not moved when data was entered into the input field, the security server computer system may send a second, follow-up test to confirm, whether the device is truly a client device that is operated by a legitimate user, such as a user that use voice commands to enter the data, or not. The second test may be different than the first test.

Signals from a series of tests on the client device may be used to select one or more countermeasures to apply to content that is requested from the client device. The state of the security server computer system or an origin server computer system may also be used to select one or more countermeasures. For example, in response to determining that the one or more signals indicate that the client device may be operated by a bot rather than a real human operator and that the origin server computer system is under an increasing load, the security computer system may select a countermeasure that slows the client device that is presumed to be an automated bot. In this example, the countermeasure may be a proof of work challenge, such as a hash generating function, along with the requested content.

2.1 Weighting Test Results or Signals

The security server computer system may select a countermeasure based on one or more signals. One or more signals, or one or more combinations of signals, may be more conclusive in determining whether a request is from a device controlled by a legitimate human user or an automated browser or bot. The selection of a countermeasure may be based on weighting signals according to one or more rules to identify a particular countermeasure or a countermeasure category to be employed when responding to the client device.

3.0 Example System and Process for Selecting and Sending Tests and Countermeasures FIG. 1 illustrates a system for characterizing a client device, and selecting one or more countermeasures for a client device in an example embodiment. In FIG. 1, there is shown system 100 that centers on interaction between client device 102 and security server computer 104 over one or more computer networks, such as network 199. In general, system 100 is arranged so that security server computer 104, which may be one or more server computers, sends testing code to execute on client device 102 to test, or retrieve the state of, client device 102 or one or more programs executing on client device 102, and return signals that are indicative of the context or state of client device 102. FIG. 1 illustrates a client device, client device 102, making requests for content to, or executing tests or countermeasures from, a security server computer, security server computer 104. However, in other embodiments, one or more client devices can make requests for content to, or execute tests or countermeasures from, one or more security server computers. The one or more security server computers, such as security server computer 104, may combine signals from client computers using one or more rules to select one or more security countermeasures to employ with respect to interactions with client device 102.

A content system (not shown in FIG. 1) may operate in conjunction with security server computer 104. The content system may serve one or more web pages or other resources using an origin server computer system that may be responsive to a web browser or other application executing on client device 102. Security server computer 104 may share the same hardware with such a content system or may act as a physical and logical intermediary to such a content system. For example, security server computer 104 may be located at a different site than that of the content system. Security server computer 104 may be operated by a different business entity than the content system. An organization that produces security server computer systems and software may offer their products and/or services as a proxy front-end to various different organizations that serve web content.

3.1 Transmission Handler

Transmission handler 110 may interact with client device 102. Transmission handler 110 may gather information about clients that are requesting resources or determine which tests, countermeasures, or content to send to client devices based on one or more signals that are gathered. The content may be from an underlying origin server computer system. Decisions about which tests, countermeasures, or content to send can be based on data that is independent of a particular client device, such as a current system load on an origin or security server computer system and trends in that load. Additionally, or alternatively, decisions about which tests, countermeasures, or content to send to a particular client device can be based on signals that are specific to the particular client device, such as device ID information and results of tests that are served to and performed on the particular client device and indicate whether the particular client device is being used by a human user or controlled by a bot.

Transmission handler 110 may comprise or access a library of tests or countermeasures, such as client test database 112 and countermeasure database 114. Security server computer 104 or transmission handler 110 may send the tests to a client device that has requested content or other resources, such as client device 102, or an application executed on the client device, such as browser 106.

Transmission handler 110 may associate one or more tests or countermeasures with one or more categories. For example, one or more tests or countermeasures may be associated with a network configuration, device, browser, user, malware, attack, website, content, or one or more characteristics of a client computer, the network configuration of the client computer, or software running on the client computer. Transmission handler 110 may serve tests or countermeasures based on the one or more categories associated with the tests or countermeasures. For example, a set of one or more tests for determining whether to a client device is a mobile device may be associated with a mobile device category, transmission handler 110 may send one or more tests associated with the mobile device category in response to a request from a client device that purports to be a mobile device or has returned signals that indicate the client device is a mobile device.

Each category may have one or more parameters. A parameter may identify a type of the device, such as mobile, desktop, or tablet. A parameter may identify or describe a type of the content requested, such as passive, interactive with forms, or login page. A parameter may identify security or threat level for a device or content, such as devices with certain IP addresses are higher risk, or content of a particular type is higher risk.

Transmission handler 110 may be programmed with various rules, and may generate additional rules based on machine learning methods that use prior applied countermeasures tested against prior client device characteristics, and map various signals to various characteristic of countermeasures. For example, one signal may indicate that a client device is not what it says it is, and that it might be a bot. Another signal may indicate that a particular origin server computer system is experiencing a precipitous increase in request volume. A rule may take each of those signals, along with one or more other signals, and output an identifier that characterizes a type of countermeasure to be deployed, such as an anti-DoS countermeasure. Various countermeasures in countermeasure database 114 may be tagged as being such sorts of countermeasures, and may also be tagged with other characteristics. Transmission handler 110 may match the output of the rule to the closest matching countermeasure or countermeasures, and may then deploy those countermeasure(s) to the requesting client along with the content the client requested. In the DoS example here, the countermeasure may be a proof of work countermeasure, and security server computer 104 may serve code to client device 102 for carrying out that countermeasure along with code from an origin server computer system with which the user will interact, where the proof of work code may execute in the background (to ensure that client device 102 does not submit another request too quickly, such as it could in less than a fraction of a second if it were operated by a bot) while the user interacts with the content.

3.2 Client Device

Client device 102, or one or more components in client device 102, may run one or more tests and generate one or more signals. For example, when client device 102 makes a request for resources, security server computer 104 may select one or more tests written in JavaScript and serve the tests to client device 102. Browser 106 on client device 102 may execute the JavaScript tests and return signals from the tests. Code, such as HTML code, from a content server may include a reference to code on security server computer 104. Security server computer system may select one or more tests or countermeasures as return the tests or countermeasures to client device 102. Browser 106 may render the HTML code and call the JavaScript tests to produce signals that client device 102 may send to security server computer 104.

3.2.1 Test Environment

The served code or test code may include code that executes the tests or define or instantiate a managed environment that execute the tests. For example, the served code may define or instantiate test environment 108 within browser 106 or other application executing on client device 102. Test environment 108 may launch the tests, control interactions between multiple independent tests that have been provided by security server computer 104, collect one or more signals generated by execution of the tests, and send the one or more signals back to transmission handler 110 of security server computer 104. Additionally, or alternatively, each test of the one or more tests may operate as a separate process on client device 102. Test environment 108 may receive, aggregate or bundle one or more signals generated by one or more tests, encode the one or more signals to hamper or prevent tampering, and send the one or more signals to transmission handler 110 of security server computer 104.

3.3 Example Process for Selecting One or More Tests or Countermeasures

FIG. 1 also illustrates a process that the described components may employ in an example embodiment. This particular process is provided for purposes of illustration, and other processes may be employed, including processes that use some or all of the steps discussed here, and that use them in an order different than that discussed here.

3.3.1 Selecting and Sending a First Set of Tests

In Step 1, a request is sent from client device 102 to security server computer 104. The request may be made to an underlying content system, and may be intercepted by security server computer 104 acting as a proxy to the content system. Additionally, or alternatively, client device 102 may send the request in response to a reference to security server computer 104 in content received from a content server computer. The request may be in the form of a simple HTTP request that identifies resources by a URI and may or may not also include one or more parameters associated with the request. For example, parameters may encode a query directed at the resources, so that the delivered resources are responsive to the query.

In step 2, security server computer 104 fetches one or more tests from client test database 112. Such action may occur after transmission handler 110 decodes and parses the received content request if the request is a request for content. The transmission handler may also forward all or part of the content request to an origin server computer system that security server computer 104 is tasked with protecting. The origin server computer system may then return the content to security server computer 104. The obtaining of content may also occur later, such as after tests of client device 102 are completed.

Transmission handler 110 may categorize or profile client device 102, browser 106, the request, the requested content, the content server providing the content, or one or more related countermeasures in order to identify tests that may be appropriate to serve to the client device. For purposes of illustrating a clear example, assume that a request for content is received from client device 102, the content that is private, and client device 102 purports to be a mobile device. In response, transmission handler 110 may apply weights, a formula, or a lookup table to retrieve one or more tests that are associated with one or more categories that target a mobile device or private content. Also for purposes of illustrating a clear example, assume that a request is for content that is small from a content server, public, and non-interactive. In response, transmission handler 110 may determine testing and countermeasures are not required, and security server computer 104 may request the content from the content server computer, receive the content from a content server computer, and forward the content to client device 102 unchanged—without any tests or countermeasures. Accordingly, in this example, the content sent to client device 102 may be in the same form as transmission handler 110 received the content from the content server computer.

In step 3, security server computer 104 serves the tests to client device 102. For example, transmission handler 110 sends the one or more selected tests to browser 106 on client device 102.

3.3.2 Receiving Signals from the First Set of Tests

In step 4, client device 102 executes the tests. For example, test environment 108 or browser 106 may execute the JavaScript that define the tests. The tests performed may interact with one or more subsystems or one or more processes executing on client device 102. The tests may attempt to interact with a user of the device. The tests may receive readings from one or more sensors on the device. The readings may include information about spatial acceleration or other motion of the device coordinated with the time at which characters are entered into the device.

In step 5, client device 102 sends the signals back to security server computer 104. For example, test environment 108 may send the signals generated in step 4 to transmission handler 110. Such transmission may be cloaked so that it looks from the outside like an ordinary transmission, so that malicious code cannot readily identify that such a report is being provided. For example, test environment 108 may encode or encrypt the signals generated in step 4 and send, to transmission handler 110, the encoded or encrypted signals with another request from client device 102 for additional content.

3.3.3 Selecting and Sending a Second Set of Tests Based on the First Set of Tests In step 6, security server computer 104 fetches additional tests. Again, such action may take place by applying rules to features of the content, client device 102, or both—and additionally in this cycle, by applying rules to the signals received from the first round of testing. For example, one or more signals may indicate a lack of motion when data was entered, which may indicate that the data entry was by a bot or not on a mobile device; however, a lack of motion may indicate that the user employed a wireless keyboard to enter the data. Thus, the second round may select one or more different, more robust, or more intrusive tests that are determined to be complementary to the result of the first round of testing and further attempt to identify whether client device 102 is a mobile device.

In different implementations and situations, a different number of rounds of serving testing code may be performed. For example, a system may also send only one round of testing code, or zero rounds if the content profile and/or device profile indicates that testing is not needed, such as when both indicate a low-risk environment. A system may perform multiple rounds, and each round may always be directed to a particular class of goals. For example, tests in a first round may be directed to determining whether a device is what it says it is (though the header or other information). Tests in another round may be directed to determining whether foreign code is running on the device, and characterizing the foreign code. In yet other implementations, the values of signals received back from a first round of testing may affect whether a second round is performed. For example, if the first signal(s) indicate that the device is low-risk, then a second round may be avoided, but if they indicate that the device is high-risk, then a second round may be performed.

In step 7, security server computer 104 again serves test code to client device 102 as discussed in step 3. In step 8, client device 102 performs tests in the second round of testing as discussed above in step 4. In step 9, client device 102 sends the signals to security server computer 104 as discussed above for the first round of results or signals in step 5.

3.3.4 Receiving Signals from the Second Set of Tests and Selecting a Set of Countermeasures In step 10, security server computer 104 or transmission handler 110 fetches one or more countermeasures from countermeasure database 114. Such fetching may come as a result of the transmission handler or related structure evaluating the signals received from the second round of testing and optionally the signals received from the first round of testing. Transmission handler 110 may select one or more countermeasures based rules applied to one or more signals. For example, if one or more signals are associated with one or more categories, then transmission handler 110 may select one or more countermeasures associated with those categories. The one or more signals may be received or derived from one or more previous rounds of testing, features of a request, features of requested content, features of a content server computer, feature of a client computer, or more other features as discussed herein. For example, a rule may select a DoS-avoiding countermeasure when the signals indicate that client device 102 might be under the operation of a bot, and other signals indicate that a DoS attack may be beginning for the content server computer that is served by security server computer 104. Certain countermeasures may be served regardless of the received signals, such as countermeasures that transcode content from the origin server computer system in polymorphic manners to stymie attempts by malicious code to interact with or analyze the content from the origin server computer system.

3.3.5 Executing or Sending the Set of Countermeasures to the Client Computer

In step 11, security server computer 104 serves code to client device 102. The served code in this instance may include the code that was requested from the origin server computer system in the content request of step 1, whether in its original form or in a transformed form. The served code may include code for implementing the selected countermeasures, such as proof of work code, code to monitor to the execution of the origin server computer system code to ensure it is not being interfered with by malicious code, or other countermeasures. In the current example, countermeasures are sent to the client computer after sending two sets of one or more tests and receiving two sets of one or more signals. However, security server computer 104 may stop sending tests or send one or more countermeasures after security server computer 104 has enough signals to pick one or more countermeasures.

In step 12, client device 102 executes the code. For example, browser 106 may execute the countermeasures sent in step 11. Such execution may involve parsing or executing code and fetching and executing JavaScript or other code referenced in the markup code. Such action may result in additional signals being sent back to security server computer 104, such as to be used in subsequent servings of code to client device 102 or to other devices. The process shown in FIG. 1 can be repeated each time client device 102 makes a request, such as each time a user of the device navigates to a different web page of a web site.

In one or more examples herein, the requested content is sent to the requesting client computer with one or more countermeasures after data from one or more tests have been received. Additionally or alternatively, the requested content can be sent with one or more of the tests. One or more additional tests or one or more countermeasures can be sent with subsequently requested content, such as another web page. Additionally or alternatively, one or more tests or countermeasures can be sent asynchronously from the requested content.

4.0 Configurations

A security server computer may be deployed in various configurations or modes. A security server computer may be deployed or use multiple modes or configurations concurrently.

4.1 Passive or Reporting Mode

Taking an action against the web request is not necessary: the security server computer system could operate in a passive or reporting mode. This passive mode may report (for example, back to a central analysis system that aggregates data across many clients and servings) what the system would have done with the traffic had the system been in a blocking or other mode or may simply report features of the traffic.

4.2 Active Mode

In active mode, a client computer server may take actions that include but are not limited to blocking, passing, logging, applying a content based countermeasure in the response to the request, throttling or various combinations of these actions or other actions.

4.3 Real-Time Mode

The security server computer system can operate in (a) real-time mode or (b) not real-time. In real-time mode, the security may select one or more countermeasures, make one or more security decisions based on the data or signals collected and a configurable rule set.

In not real-time operation, the security server computer system receives the signals but not the web requests for content. On the basis of the signals received and configurable rules, the decision engine analyzes the request and reports a security or other decision.

4.4 in-Band and Out-of-Band Configuration

The secure delivery of signal data discussed herein can be accomplished in-band or out-of-band. In an in-band configuration, the security computer system may be a proxy or intermediary computer that is physically or logically between a client computer and a content server computer. The security server computer can act as a gatekeeper, and block requests from being sent from the client computer to the content server computer. A client computer may send signals within one or more requests for content. The payload in a response to a request in an in-band solution may include the content that was requested and one or more tests or countermeasures included or incorporated into the content.

In out-of-band configuration, the security server computer system is not placed between a client device and an origin server computer, and thus need not intercept communications between a client computer and an origin server computer. In an out-of-band configuration, a request received by security server computer 104 need not be a request for content to a content server computer that security server computer 104 is protecting. The payload in a response to an out-of-band request may be delivered asynchronously and without content from a content server computer.

Figure 2:
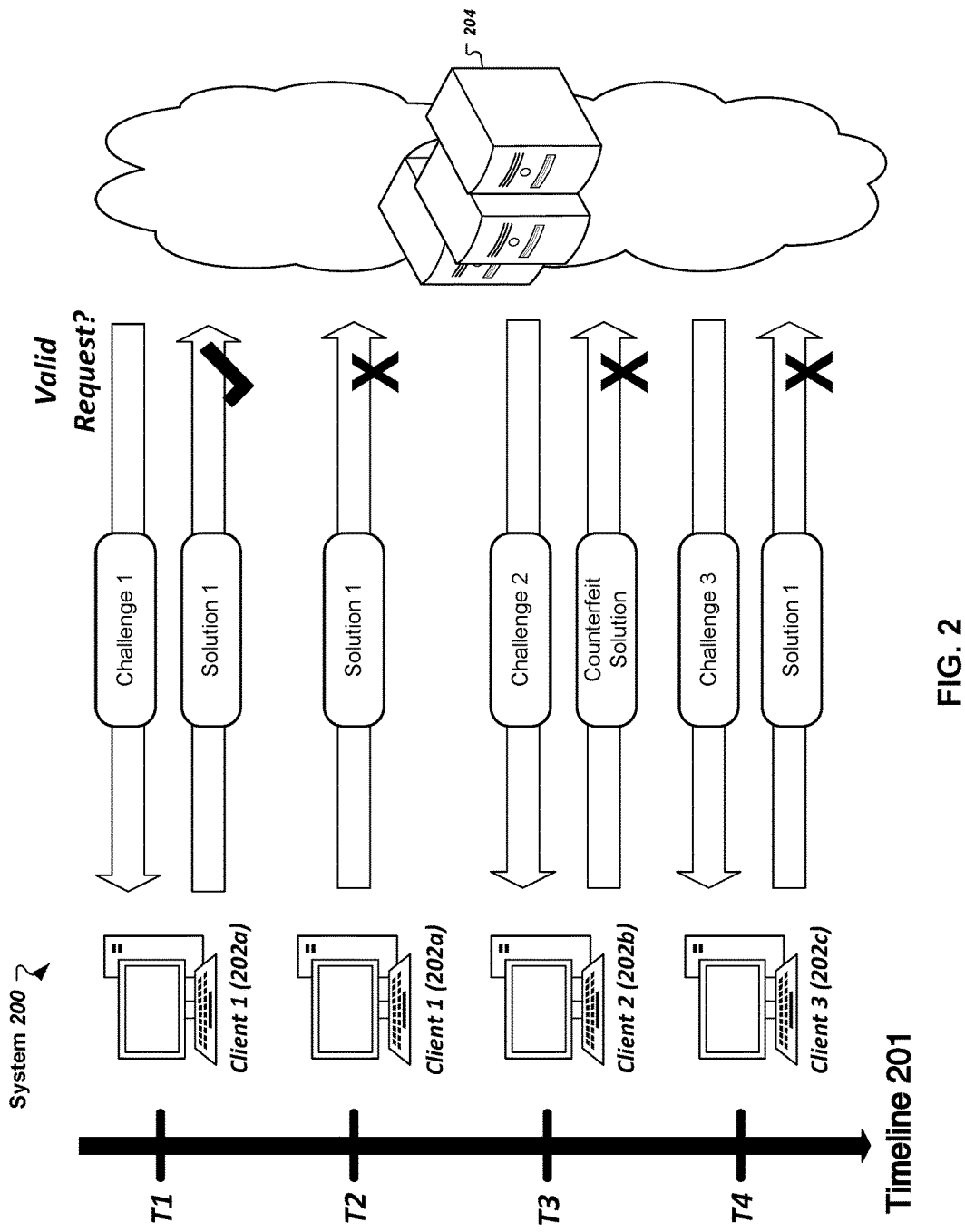
FIG. 2 illustrates a system and timeline over which various client devices submit requests that include a challenge solution or signal to a security server computer system in an example embodiment.

5.0 Example Interactions Between Client Computers and a Security Server Computer FIG. 2 illustrates a system and timeline over which various client devices submit requests that include a challenge solution or signal to a security server computer system in an example embodiment. A challenge may be a test or countermeasure. A challenge solution may be a signal or response to a countermeasure that can be used to allow or rejection requests from a client computer. Such challenge solutions may be used as part of testing like that described above to characterize aspects of the client device and obtain signals from such characterization. The challenge solutions may also be used after the testing, such as where the testing indicates that the client device may be a bot, and the serving of the challenge solution is aimed at slowing the bot down.

In FIG. 2, timeline 201 conceptually depicts that particular requests may be accepted and others denied. For example, at time T1, in timeline 201, security server computers 204 provide content to client computer 202a. In response, client computer 202a solves a first challenge included in the content, and submits a request to initiate a web transaction (for example, to add items to an electronic shopping cart). The solution is accurate, and other aspects or signals of the request may be verified. Security server computers 204 may thus accept the first request from first client computer 202a so that the requested transaction can be performed. Security server computers 204 may store data in an anti-replay log indicating that solution 1 was received from a client computer or that a correct solution was received from the client computer.

Later, at time T2, in timeline 201, client computer 202a re-submits a request that includes the same solution to the first challenge. Security server computers 204 may check the anti-replay log and find that the solution to the first challenge has already been submitted at an earlier time, and for that reason the request may be deemed invalid. Security server computers 204 may terminate the request at time T2.

At time T3, in timeline 201, security server computers 204 send a new, second challenge to client computer 202b. Rather than solving the second challenge that client computer 202b was provided, client computer 202b submits a counterfeit solution, such as no solution or a solution to a challenge that was illegitimately generated by attackers in advance of the second challenge being served. Security server computers 204 may detect that the counterfeit solution is invalid, indicating that the solution or challenge may have been manipulated. Accordingly, security server computers 204 reject, terminate or do not accept the request at time T3 from client computer 202b.

At time T4, in timeline 201, security server computers 204 serves, to client computer 202c, a third challenge with parameters that are different from either of challenges 1 or 2. Client computer 202c may be infected with malware and under the control of a botnet. In another attempt to subvert the challenge, client computer 202c does not wait to determine a solution to the third challenge, but instead submits a solution to the first challenge that was provided by client computer 202a at time T1. However, because solutions to the first challenge have already been included in requests to security server computers 204 as indicated by the anti-replay log, the request made by client computer 202c at time T4 is denied. Accordingly, FIG. 2 generally illustrates how various safeguards may be implemented to ensure the integrity of challenges. Security server computers 204 can validate requests by not only checking whether a solution proffered in a request is accurate, but also by checking that a challenge and solution are not being replayed, and by checking that the challenge has not been manipulated.

6.0 Example Network Configuration

Figure 3:
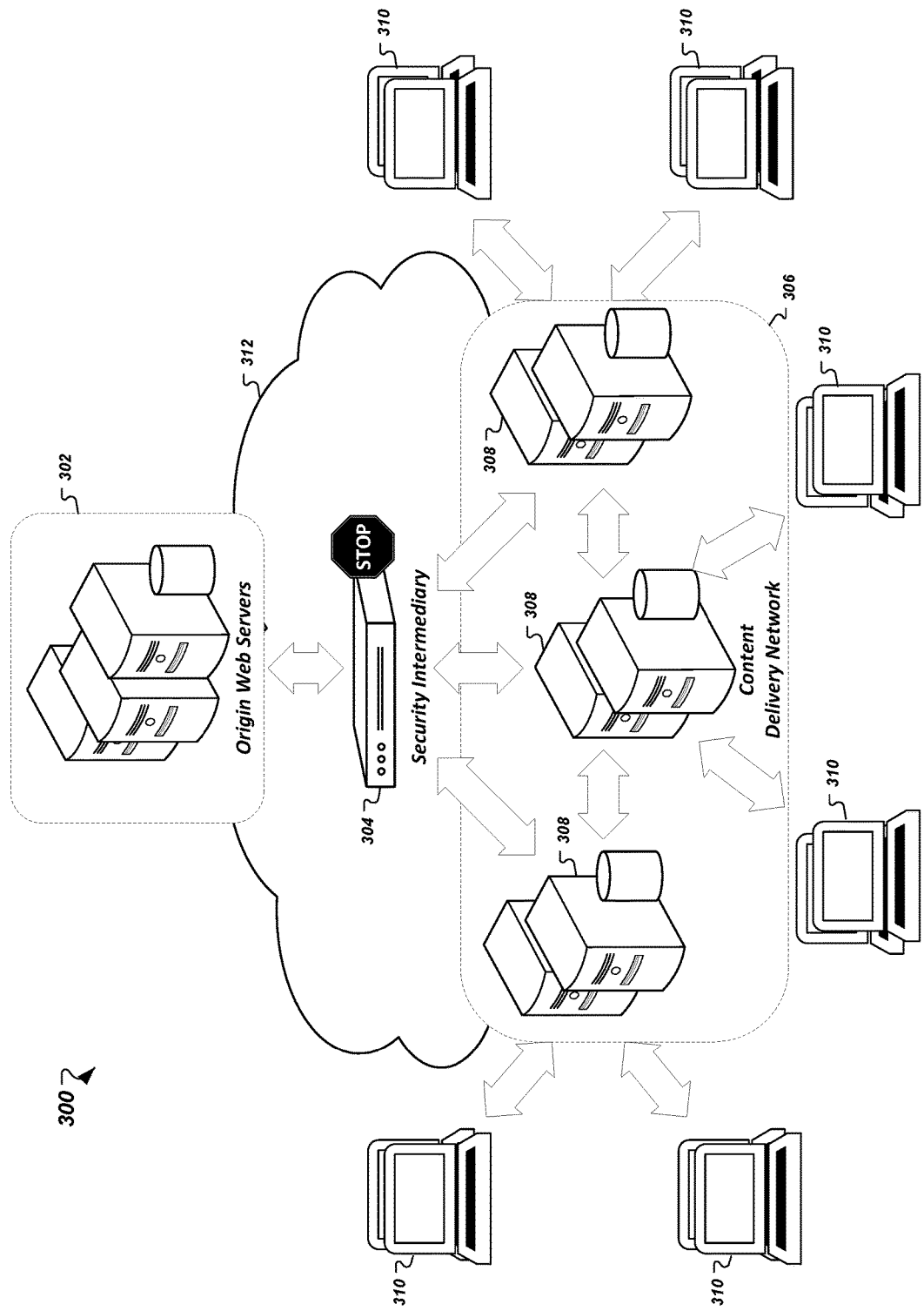
FIG. 3 illustrates an example embodiment of a network topography for communicating requests and content between origin server computers and client computing devices via a security server computer and a content delivery network (CDN).

FIG. 3 illustrates an example network topography for communicating requests and content between origin server computers and client computing devices via a security server computer and a content delivery network (CDN). Generally, the diagram in FIG. 3 is provided as a framework to describe various manners in which the methods, systems, devices, and other techniques described herein may be arranged to implement user-agent (client) challenges for the improvement of web security, including as part of a process of gathering signals to use in the selection of countermeasures to be deployed with the serving of requested code.

FIG. 3 shows, by way of example, how various stages of processing for these techniques may be carried out by particular components of network 300, such as by origin server computers 302, security intermediary computer 304, CDN server computers 308, or client devices 310. However, the particular configurations described in these drawings are provided as examples only. In some implementations, certain of the processing stages may occur at other ones of the network components than the components that are explicitly provided in the figures, or may be distributed among multiple components.

In FIG. 3, electronic content, such as electronic resources or web pages, may be transmitted to client devices using CDN 306. CDN 306, along with origin server computers 302 and security intermediary computer 304, can be geographically separated and physically distinct from client devices 310 that form endpoints of network 300. Accordingly, origin server computers 302, security intermediary computer 304, and CDN 306 are all shown as being located at least partially within the cloud 312. Thus, from the perspective of one of client devices 310, request and responses may appear to be sent and received generally to and from a network in the cloud 312, although distinct components within the network may handle different aspects of processing communications with a client device among client devices 310. Client devices 310 may be any of various types of computing devices that may communicate over a network, such as mobile devices (for example, smartphones, tablet computers, wearable computers), notebook computers, or desktop computers. Client devices 310 may, for example, use web browsing applications to access and to execute web pages or other content over the internet or other network. The web browsing applications may have a JavaScript engine, for example, that can run challenges written in JavaScript or other suitable languages.

CDN 306 can include CDN server computers 308 in distributed data centers across a plurality of geographically dispersed locations. Different individual server computers in CDN server computers 308 or groups of CDN server computers 308 may each represent a node in CDN 306 at an edge of network 300. The nodes may be located at the edges of network 300 because they are proximate to the client devices 310, and are thus closer in network 300 to client devices 310 than are other components such as origin server computers 302. CDN 306 may be configured to deliver content hosted by origin server computers 302 to client devices 310 with high availability and performance. CDN server computers 308 in CDN 306 can act as intelligent intermediaries between origin server computers 302 and client devices 310. For example, when a client device among client devices 310 submits a request for content on a domain hosted by origin server computers 302, CDN 306 can intelligently direct the request to CDN server computers 308 at a particular node of CDN 306 that is determined to be best situated to handle the request. An optimal node of CDN 306 to handle the request may be selected based on factors such as the distance between the node and the requesting client device among client devices 310, the present availability of the node, and the nature of the particular content being requested. For example, the optimal node may be the node that is located closest to a particular client device of client devices 310 that submitted a request. The distance or closeness between a node and a client device may be measured by the expected time for communications to be transmitted between the node and the client, or as measured by the node that is the fewest number of network hops away from the client). The optimal node of CDN 306 can process the request and determine how to handle it in an efficient manner. In some implementations, each of the nodes or computers in CDN 306 may cache content from origin server computers 302, so that the nodes may respond to requests from client devices 310 with cached content, when the requested content has been cached, rather than pinging origin server computers 302 to obtain the content for each request. In this way, CDN 306 can significantly reduce the load on origin server computers 302 due to the distributed network of CDN server computers 308 handling requests for popular, cached content. CDN 306 can also help to improve the response times for handling requests due to the additional computing capacity provided by CDN server computers 308, and the distribution of requests to optimally selected nodes that may be located closest to the respective client devices 310 that have made requests over network 300.

Client devices 310 may request web content from origin server computers 302, which may include a system of one or more computers. Origin server computers 302 may serve various types of content, such as web code (for example, HTML, JavaScript, Cascading Style Sheets) for web pages, media files, applications, and more. Origin server computers 302 may also execute server-side applications that power services delivered to client devices 310. For example, origin server computers 302 may host an e-commerce website. Origin server computers 302 may host text, web code, images, and other media files that are part of the website, and may run various server-side applications to dynamically generate content specific to particular requests.

In some implementations, network 300 may include security intermediary computer 304. Security intermediary computer 304 may include one or more computers that are located in network 300 between and distinct from origin server computers 302 and client devices 310. In some implementations, security intermediary computer 304 may be proximate to origin server computers 302, and may be located between CDN server computers 308 of CDN 306 and origin server computers 302. For example, security intermediary computer 304 may be arranged as a reverse proxy or a full proxy in front of origin server computers 302. When arranged as a reverse proxy, security intermediary computer 304 may intercept all or a portion of incoming communications for origin server computers 302, such as communications forwarded from CDN 306, but not client requests that have been blocked by CDN 306, and may process all or a portion of outbound communications from origin server computers 302. In some implementations, security intermediary computer 304 may operate in coordination with various sites at multiple domains, which sites may be hosted on a common set of origin server computers 302, or on respective sets of origin server computers for each of the domains/sites. Security intermediary computer 304 may be implemented on dedicated computers that are physically distinct from the computers for origin server computers 302. In some implementations, security intermediary computer 304 may be implemented, not on physically separate hardware, but as one or more modules on origin server computers 302. In some implementations, one or more security intermediary computers may be provided at all or particular ones of the nodes in CDN 306, and may be implemented as software modules within CDN server computers 308 of CDN 306 or as dedicated hardware co-located with CDN server computers 308 of CDN 306.

Figure 6:
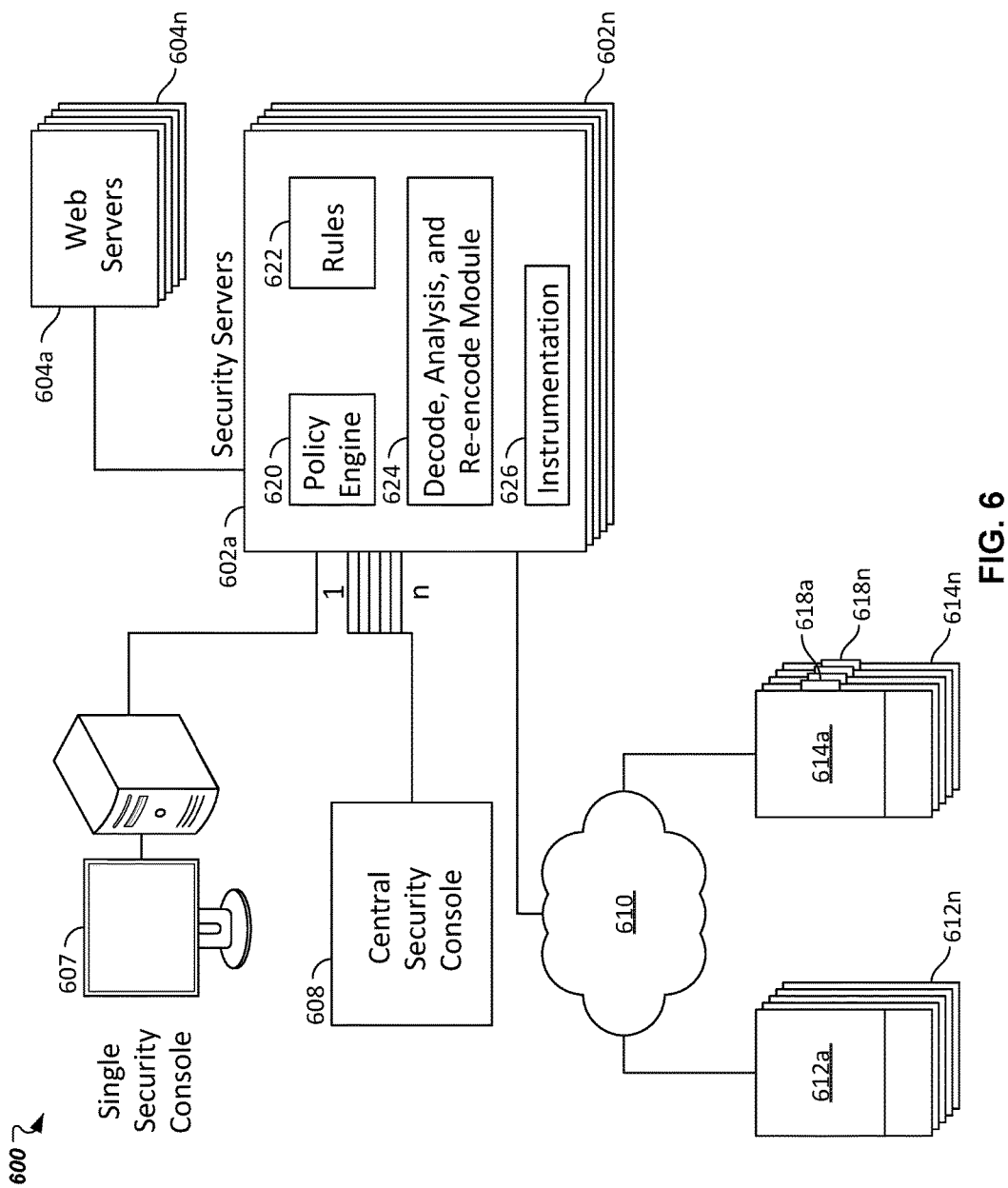
FIG. 6 illustrates an example computer system for serving content, tests, or countermeasures in an example embodiment.

Generally, security intermediary computer 304 may be programmed to perform one or more types of transformation on electronic content that is to be served to client devices 310, in addition to other operations such as the serving of code to perform tests of requesting clients. For example, security intermediary computer 304 may re-code content that is outputted from origin server computers 302, and may apply reverse transformations to requests made from a re-coded web page on a client device among client devices 310 so that the request is recognizable by origin server computers 302. Similarly, for security intermediary computer 304 distributed in CDN 306, security intermediary computer 304 may re-code content to be served to client devices 310 from CDN server computers 308, and may apply reverse transformations to requests from client devices 310 from a re-coded web page so that the request may be recognized by CDN server computers 308. In some implementations, security intermediary computer 304 may be configured to perform operations like those carried out by security server computer 104 in system 100 (FIG. 1), security server computers 204 in system 200 (FIG. 2), or security server computers 602a-602n of system 600 (FIG. 6). For example, security intermediary computer 304 may re-code portions of the web code for a web page that is to be served to a client device of client devices 310. The re-coding can involve applying random transformations to select portions of the original code, to obscure an operational design of origin server computers 302 and/or CDN server computers 308. In some implementations, security intermediary computer 304 may randomize elements of a web page's implicit API, such as form names, attribute values, and hyperlink addresses, to interfere with the ability of malware at client devices 310 to exploit the implicit API to perform fraudulent transactions or other malicious actions. Security intermediary computer 304 may re-code content differently each time it served, for example, to create a moving target that may prevent bots from predicting how a page will be re-coded in any particular instance. In some implementations, security intermediary computer 304 may re-code content in other manners as well, such as inserting decoy code, randomizing HTML tag names, and splitting form fields into multiple fields that each accept a portion of content typed by a user.

In some implementations, security intermediary computer 304 may instrument electronic content that is to be served to a client device of client devices 310 with code (for example, JavaScript) programmed to collect information about client devices 310 that execute the content, and about interactions with the content at client devices 310—and that returns signals to the security intermediary that characterizes such testing. The instrumented code may then report the collected information over a network to security intermediary computer 304 or to another portion of a computing system for analysis.

Such a challenge may be generated at a set of origin server computers. For example, a web page, shopping.html, can be supplemented with the challenge code at the origin server computers as well, and the supplemented code can then be served to the client computer through a node in a content delivery network. When the client computer thereafter solves the challenge test and submits a request, the node in the content delivery network can validate the solution, and can take action to either allow or deny the request based on the determined validity of the solution.

Various stages in the process may take place at different ones of the components depicted in network 300 of FIG. 3. For example, the challenge may be generated and inserted into electronic content being served at any one of origin server computers 302, security intermediary computer 304, and one or more nodes of the CDN 306. Similarly, any one or more of these components may be configured to validate a solution provided by a client device among client devices 310. In some implementations, security intermediary computer 304 proximate to the origin server computers 302, or proximate to the nodes in CDN 306, may both generate and insert the challenge, and may also validate solutions to the challenge from client devices 310. In some implementations, origin server computers 302 or CDN server computers 308 may generate and insert the challenge, and validate solutions, or otherwise evaluate signals from this and other testing performed on the devices.

In some implementations, in the absence of a CDN 306, security intermediary computer 304 acting as a proxy to origin server computers 302 may implement challenges and validate their solutions. For example, security intermediary computer 304 may intercept an outbound web page from origin server computers 302, may generate and insert a challenge into the web page, and may then transmit the re-coded web page that includes code for the challenge to one of client devices 310. When a client device among client devices 310 submits a solution to the challenge, the security intermediary can again intercept the communication before it reaches the origin server computers 302, and can determine whether the solution is valid. If the solution is determined to be valid, the communication can be provided to the origin server computers 302. If not, the communication may be blocked.

In some implementations, client devices 310 can communicate with origin server computers 302 directly, without either security intermediary computer 304 or CDN 306. In these implementations, origin server computers 302 may generate the challenge, supplement the content to be served with the challenge, and also determine whether solutions from client devices 310 are valid. If a solution is determined to be valid, the origin server computers 302 may act on the request (for example, may initiate a web transaction specified in the request). If a solution is not determined to be valid, the origin server computers 302 may not respond as requested. For example, the origin server computers 302 may return an error page to the client device among client devices 310 indicating that the requested transaction could not be performed.

7.0 Example Process for Testing a Client Computer and Selecting Countermeasures

Figure 4:
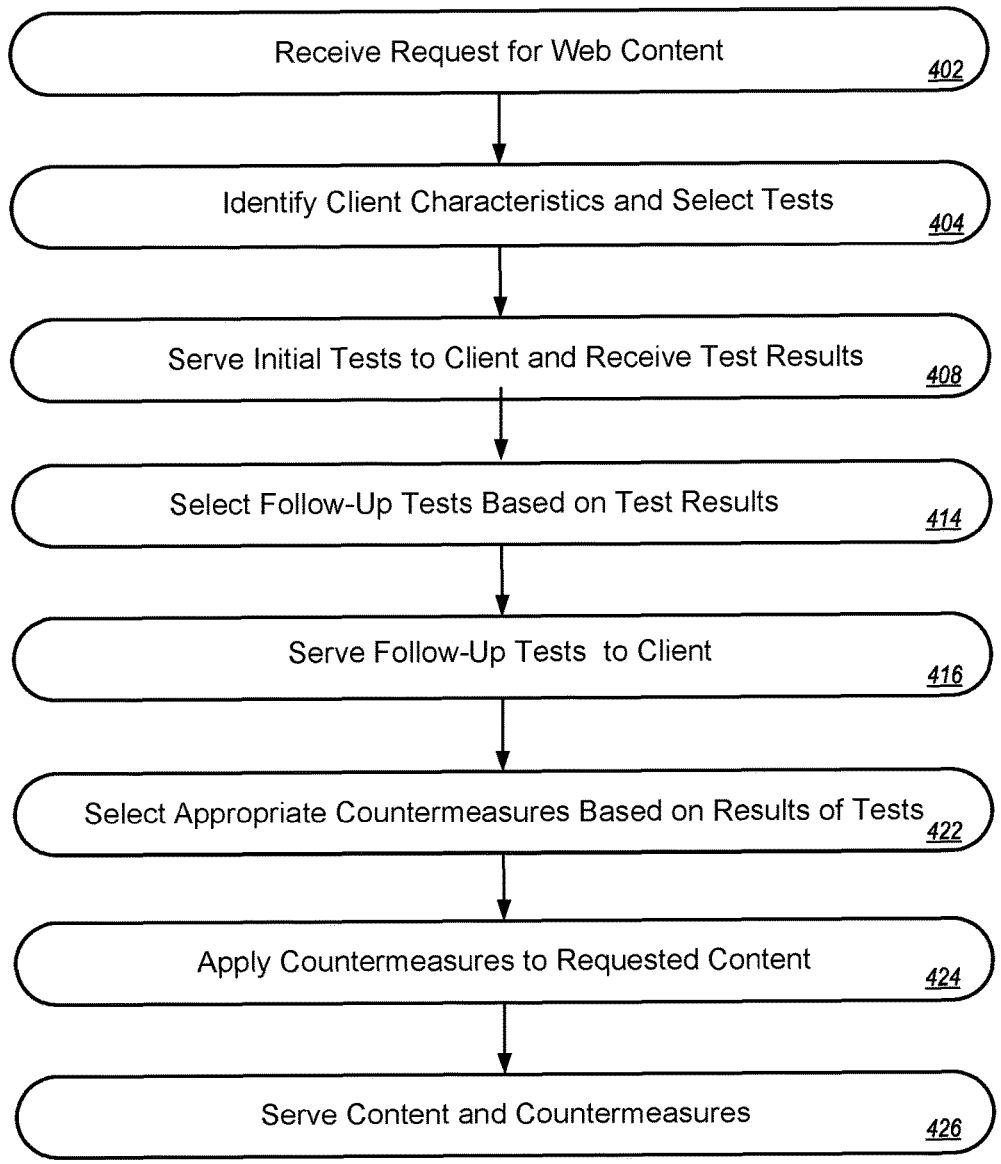
FIG. 4 illustrates a process for testing client devices and selecting countermeasures based on one or more signals in an example embodiment.
Figure 5:
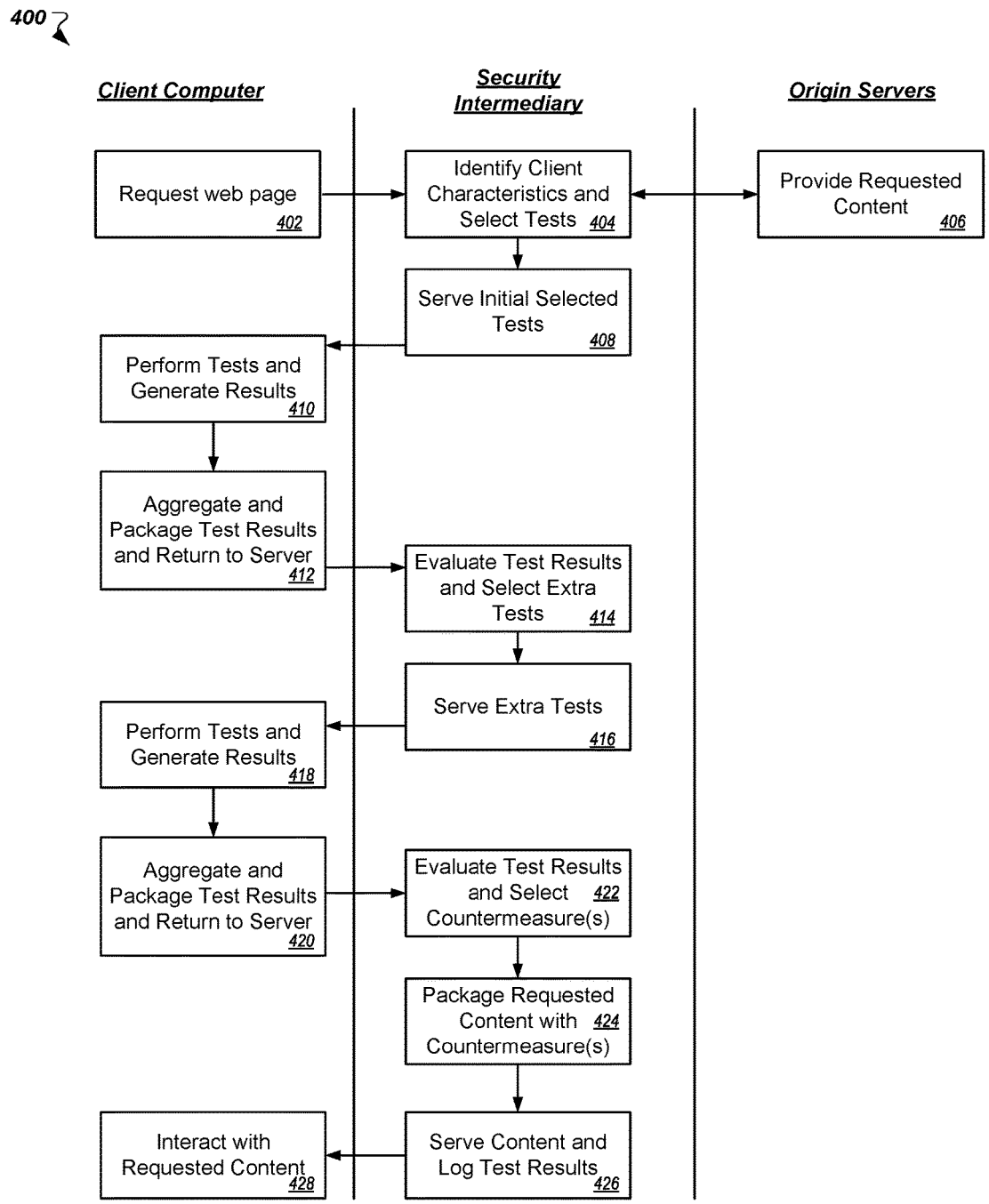
FIG. 5 is a swim lane diagram of for selecting and updating security countermeasures for a client device in an example embodiment.

FIG. 4 illustrates a process for testing client devices and selecting countermeasures based on one or more signals in an example embodiment. The process involves transmitting code to a client computer after the client computer requests content, receiving signals from the client computer after the client computer has executed the tests, and sending one or more countermeasures to the client computer based on the signals that were received. FIG. 5 is a swim lane diagram of for selecting and updating security countermeasures for a client device in an example embodiment. The process in FIG. 5 comprises the steps in process 400 with additional detail for the example process.

In step 402, a security server computer receives a request for web content from a client computer. Such a request may take the form of an HTTP or similar request from a web browser of a client device, and may be intercepted by a security intermediary that is acting as a proxy or reverse proxy for one or more origin server computers. For purposes of illustrating a clear example, assume that the web content that was requested is hosted on a single origin server computer.

In step 404, the security intermediary identifies characteristics of the client computer and selects one or more tests. For example, information that is part of the request may partially characterize the client by identifying the device type of the client computer or an IP address purporting to identify a location of the client computer (or a proxy through which the client computer is communicating). As discussed above, the security intermediary computer may select one or more tests based on characteristics about the client computer or characteristics of the requested content, which may have been retrieved and analyzed to identify such content characteristics, along with one or more signals.

In step 406, the security intermediary computer may parse the request and obtain the requested content from the origin server. In addition to the test selected in step 404, or in alternative to selecting tests in step 404, the security intermediary computer may select one or more tests using rules based on information received from the client, information about the requested content, information about a current security status of the security intermediary and origin server computers, or any other data discussed herein.

In step 408, the security intermediary server computer serves the selected tests and the requested content to the requesting client computer. Serving the selected tests may involve packaging the tests with an executing environment in which the tests can execute, and including mechanisms for gathering and encoding signals generated from the tests.

In step 410, the client computer performs the served tests and generates results from such performance. The results may then be packaged with each other as signals that indicate characteristics of the device and of processes executing on the device that may be relevant to selecting additional follow-up tests and/or to select security countermeasures that are especially tailored to work with respect to the client computer and its characteristics.

In step 412, through a test environment created by code served from the security intermediary in step 408, the client computer aggregates and packages the test result signals in a communication that is protected from snooping or alteration, and returns the signals in the package to the security intermediary computer.

In step 414, the intermediary computer receives and evaluates those signals and optionally selects one or more tests based on those signals. Such tests may be selected to obtain clarification of problems that may have been identified by a previous round of tests, such as by having the follow-up tests address the same characteristic of the client computer, but doing so in a different manner or using a different method to more accurately determine one or more characteristics of the client computer, browser on the client computer, or other application running on the client computer.

In step 416, the intermediary computer serves the one or more additional tests selected in step 414. The intermediary computer may serve the one or more additional tests to the client computer as discussed herein including step 408.

In step 418, the client computer receives the one or more additional tests selected in step 416. The client computer also performs the one or more additional tests to produce one or more additional signals.

In step 420, the client computer sends the signals generated from the follow-up tests to the intermediary computer using one or more of the methods discussed herein.

In step 422, the intermediary server computer may select one or more countermeasures based on the signals from the first round of tests, signals from the second round of tests, rules, additional signals from one or more additional rounds, or one or more other features discussed herein. Such signals from the two different rounds may be related to separate aspects of the client device, such as an initial round directed to determining whether the device has the characteristics that it advertises, and a second round determining what sort of processes are executing on the device to determine whether any of them is malicious.

In step 424, the intermediary computer packages the requested content in step 402 with the one or more countermeasures selected in step 422. For example, the intermediary computer may append countermeasures to the content requested in step 422. For purposes of illustrating another clear example, assume that intermediary computer determined that the client computer was executing a particular browser based on the signals that were received from the client computer. The intermediary computer may select a countermeasure that encodes data into a format that the particular browser is known to support based on a rule that indicates with the particular browser. Accordingly, the intermediary computer may encode the content requested in step 402 into the particular format and include code that causes the particular browser to correctly decode the content.

In step 426, the intermediary computer serves the content and one or more countermeasures to the client computer, and logs the results or signals of the observations of the client computer. In particular, various signals or characterizations of the client computer may be saved into a database that comprises signals and characteristic data from one or more other client computers that have requested content or performed tests or countermeasures. Such gathering of data across a large number of client computers may then be used in an aggregated manner to perform analysis to quickly identify and characterize emerging security threats, and to develop new and improved countermeasures to be served in the future against various threats.

In step 428, the client computer interacts with the served content. For example, a human user may fill in fields in a form generated by the content, and may submit such information. The process shown here may be repeated for the client computer, for each follow-up content request made by the client computer or each time a user of the client computer navigates to a new web page.

8.0 Example Network Configuration and Security Server Computers

FIG. 6 illustrates an example computer system for serving content, tests, or countermeasures in an example embodiment. In FIG. 6, the system 600 may be adapted to perform deflection and detection of malicious activity with respect to an origin server computer system. The system 600 in this example is a system that is operated by or for a large number of different businesses that serve web pages and other content over the internet, such as banks and retailers that have online presences. Examples include online stores or online account management tools. The main server computer systems operated by those organizations or their agents are designated as origin server computers 604a-604n, and could include a broad array of origin server computers, content server computers, database server computers, financial server computers, load balancers, and other necessary components (either as physical or virtual server computers).

A set of security server computers 602a to 602n are shown connected between the origin server computers 604a to 604n and a network 610 such as the internet. Although both extend to n in number, the actual number of sub-systems could vary. For example, certain of the customers could install two separate security server computer systems to serve all of one or more origin server computer systems, such as for redundancy purposes. One or more particular security server computers of security server computers 602a-602n may be matched to particular ones of the origin server computer systems 604a-604n, or they may be at separate sites, and all of the origin server computers for various different customers may be provided with services by a single common set of security server computers 602a-602n. Security server computers 602a-602n may be at a single co-location facility, which may minimize bandwidth issues.

Each computer of the security server computers 602a-602n may be arranged and programmed to carry out operations like those discussed above and below and other operations. For example, a policy engine 620 in each such security server computer system may evaluate HTTP requests from client computers (for example, desktop, laptop, tablet, and smartphone computers) based on header and network information, and can set and store session information related to a relevant policy. The policy engine may be programmed to classify requests and correlate them to particular actions to be taken to code returned by the origin server computer systems before such code is served back to a client computer.

When such code returns, the policy information may be provided to decode, analysis, and re-encode module 624, which matches the content to be delivered, across multiple content types (for example, HTML, JavaScript, and CSS), to actions to be taken on the content (for example, using XPATH within a DOM), such as substitutions, addition of content, and other actions that may be provided as extensions to the system. For example, the different types of content may be analyzed to determine naming that may extend across such different pieces of content (for example, the name of a function or parameter), and such names may be changed in a way that differs each time the content is served, for example, by replacing a named item with randomly-generated characters. Elements within the different types of content may also first be grouped as having a common effect on the operation of the code (for example, if one element makes a call to another), and then may be re-encoded together in a common manner so that their interoperation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the origin server computer system reporting that it has implemented new or updated content. The determination may also be a "pull" from security server computers 602a-602n, such as by the security server computers 602a-602n implementing a web crawler (not shown) to recursively search for new and changed content and to report such occurrences to the security server computers 602a-602n, and perhaps return the content itself and perhaps perform some processing on the content (for example, indexing it or otherwise identifying common terms throughout the content, creating DOMs for it, etc.). The analysis to identify portions of the content that should be subjected to polymorphic modifications each time the content is served may then be performed according to the manner discussed above and below.

Rules 622 may comprise one or more rules for performing analysis of signals or other features discussed herein. Rules 622 may define which test(s) or countermeasure(s) to select based on the one or more signals or other features discussed herein. Rules 622 may also define one or more rules encode, decode, or re-encoding content. Rules 622 may be populated with rules written or developed by a user or operator by observation of particular content types, such as by operators of a system studying typical web pages that call JavaScript content and recognizing that a particular method is frequently used in a particular manner. Such observation may result in rules 622 may comprise on or more scripts, data structures, or code to execute the scripts or process the data structures, and perform the rules.

Decode, analysis, and re-encode module 624 encodes content being passed to client computers from an origin server computer according to relevant policies and rules. Decode, analysis, and re-encode module 624 also reverse encodes requests from the client computers to the relevant origin server computer(s). For example, a web page may be served with a particular parameter, and may refer to JavaScript that references that same parameter. Decode, analysis, and re-encode module 624 may replace the name of that parameter, in each of the different types of content, with a randomly generated name, and each time the web page is served (or at least in varying sessions), the generated name may be different. When the name of the parameter is passed back to the origin server computer, it may be re-encoded back to its original name so that this portion of the security process may occur seamlessly for the origin server computer.

A key for the function that encodes and decodes such strings can be maintained by security server computers 602a-602n along with an identifier for the particular client computer so that security server computers 602a-602n may know which key or function to apply, and may otherwise maintain a state for the client computer and its session. A stateless approach may also be employed, whereby security server computers 602a-602n encrypts the state and stores it in a cookie that is saved at the relevant client computer. The client computer may then pass that cookie data back when it passes the information that needs to be decoded back to its original status. With the cookie data, security server computers 602a-602n may use a private key to decrypt the state information and use that state information in real-time to decode the information from the client computer. Such a stateless implementation may create benefits such as less management overhead for security server computers 602a-602n (for example, for tracking state, for storing state, and for performing clean-up of stored state information as sessions time out or otherwise end) and as a result, higher overall throughput.

Decode, analysis, and re-encode module 624 and security server computers 602a-602n may be configured to modify web code differently each time it is served in a manner that is generally imperceptible to a user who interacts with such web code. For example, multiple different client computers may request a common web resource such as a web page or web application that an origin server computer provides in response to the multiple requests in substantially the same manner. Thus, a common web page may be requested from an origin server computer, and the origin server computer may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. Decode, analysis, and re-encode module 624 may be adapted to apply different modifications to each instance of a common web resource, or common portion of a web resource, such that the web code that it is ultimately delivered to the client computers in response to each request for the common web resource includes different modifications.

Such modification may occur according to a process that analyzes the code once for each time it changes in a material way, and then applies the analysis multiple times. For example, elements that can be changed without affecting the presentation of a web page may be located by way of analysis, as may additional instances of those elements through all the code (for example, HTML, CSS, and JavaScript). A mapping may be made of the types and locations of such elements. Then, each time the code is to be served, the mapping may be used to place random characters or other substitute content in place of each occurrence of each such element. This repeated process may be performed, in certain implementations, with much less computational overhead than would a combined reanalysis and substitution for every serving.

Security server computers 602a-602n can apply the modifications in a manner that does not substantially affect a way that the user interacts with the resource, regardless of the different transformations applied, even where different modifications are applied in responding to multiple requests for a common web resource. For example, when two different client computers request a common web page, security server computers 602a-602n applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

In some implementations, decode, analysis, and re-encode module 624 may be configured to generate challenges, insert challenges, and validate solutions to challenges that occur in requests from client computers. For example, decode, analysis, and re-encode module 624 may determine parameters for an HMAC/SHA-2 hashing challenge, and insert code into content to be served that causes a client to compute a solution to the challenge.

An instrumentation module 626 is programmed to add instrumentation code to the content that is served from an origin server computer. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other metadata that is helpful in characterizing the activity. Such information can be used to help determine whether the action was malicious or benign.

The instrumentation code may also analyze the DOM on a client computer in predetermined manners that are likely to identify the presence of and operation of malicious software, and to report to security server computers 602a-602n or a related system. For example, the instrumentation code may be programmed to characterize a portion of the DOM when a user takes a particular action, such as clicking on a particular on-page button, to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or security server computers 602a-602n, to produce a representation of the DOM (for example, in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from origin server computers 604a-604n, as encoded by decode, analysis, and re-encode module 624, may be rendered on web browsers of various client computers. Uninfected client computers 612a-612n represent computers that do not have malicious code programmed to interfere with a particular site a user visits or to otherwise perform malicious activity. Infected client computers 614a-614n represent computers that do have malware or malicious code (618a-618n, respectively) programmed to interfere with a particular site a user visits or to otherwise perform malicious activity. In certain implementations, the client computers 612, 614 may also store the encrypted cookies discussed above and pass such cookies back through the network 610. The client computers 612, 614 will, once they obtain the served content, implement DOMs for managing the displayed web pages, and instrumentation code may monitor the respective DOMs as discussed above. Reports of illogical activity (for example, software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 612, 614. For small-scale analysis, each web site operator may be provided with a single security console 607 that provides analytical tools for a single site or group of sites. For example, the console 607 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

Console 607 may also be multiple different consoles used by different employees of an operator of the system 600, and may be used for pre-analysis of web content before it is served, as part of determining how best to apply polymorphic transformations to the web code. For example, in combined manual and automatic analysis like that described above, an operator at console 607 may add, remove, or edit one or more rules to rules in rules 622, or apply one or more rules from rules 622, which guide the transformation that is to be performed on the content when it is ultimately served. The rules may be written explicitly by the operator or may be provided by automatic analysis and approved by the operator. Alternatively, or in addition, the operator may perform actions in a graphical user interface (for example, by selecting particular elements from the code by highlighting them with a pointer, and then selecting an operation from a menu of operations) and rules may be written consistent with those actions.

A central security console 608 may connect to a large number of web content providers, and may be run, for example, by an organization that provides the software for operating security server computers 602a-602n—an organization separate from the organizations that serve the content. Such console 608 may access complex analytical and data analysis tools, such as tools that identify clustering of abnormal activities across thousands of client computers and sessions, so that an operator of the console 608 can focus on those clusters in order to diagnose them as malicious or benign, and then take steps to thwart any malicious activity.

In certain other implementations, the console 608 may have access to software for analyzing telemetry data received from a very large number of client computers that execute instrumentation code provided by the system 600. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 608 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 600, may be blocked from interaction, or may have their operators notified that their computer is potentially running malicious software (for example, by sending an e-mail to an account holder of a computer so that the malicious software cannot intercept it easily).

9.0 Implementation Mechanisms—Hardware Overview

Figure 7:
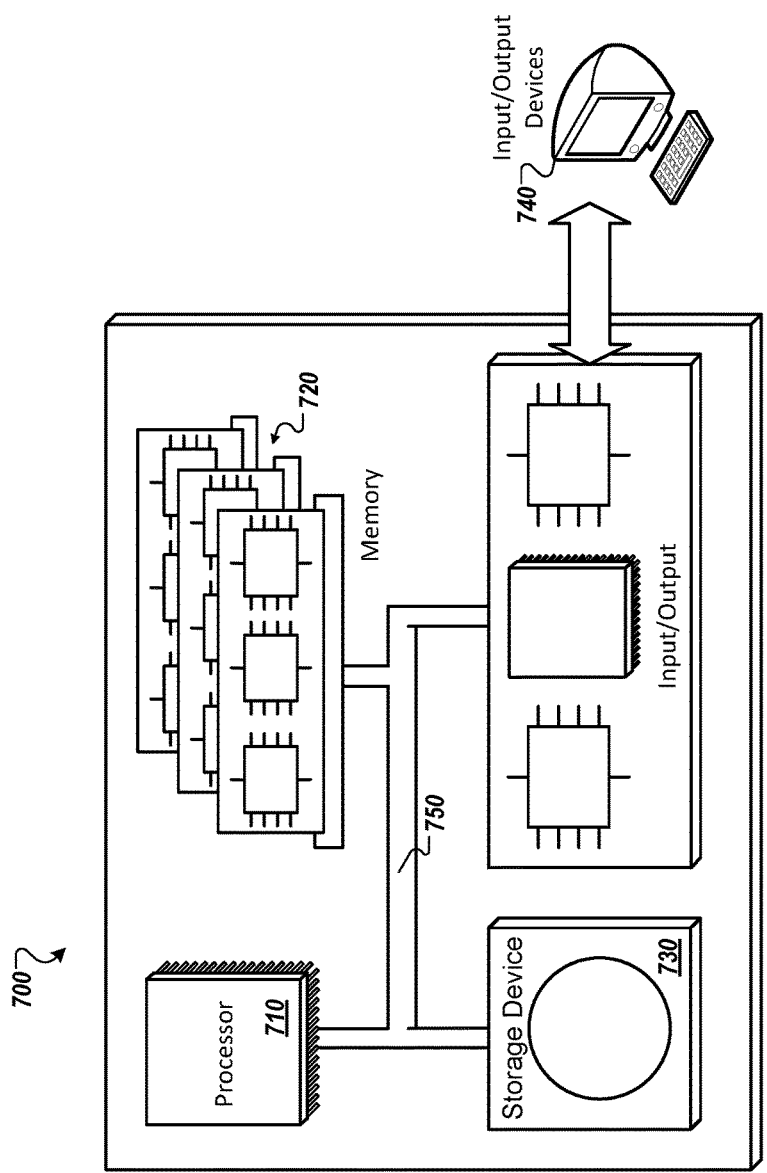
FIG. 7 illustrates a computer system upon which an embodiment may be implemented.

FIG. 7 illustrates a computer system upon which an embodiment may be implemented. In FIG. 7, system 700 can be used to carry out the operations described in association with any of the computer-implemented methods described previously, according to one implementation. System 700 is intended to include various forms of digital computers, such as laptops, desktops, workstations, personal digital assistants, server computers, blade server computers, mainframes, and other appropriate computers. System 700 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

System 700 includes processor 710, memory 720, storage device 730, and input/output device 740. Each of the components 710, 720, 730, and 740 are interconnected using system bus 750. Processor 710 is capable of processing instructions for execution within system 700. The processor may be designed using any of a number of architectures. For example, processor 710 may be a CISC (Complex Instruction Set Computers) processor, a RISC (Reduced Instruction Set Computer) processor, or a MISC (Minimal Instruction Set Computer) processor.

In one implementation, processor 710 is a single-threaded processor. In another implementation, processor 710 is a multi-threaded processor. Processor 710 is capable of processing instructions stored in memory 720 or on storage device 730 to display graphical information for a user interface on input/output device 740.

Memory 720 stores information within system 700. In one implementation, memory 720 is a computer-readable medium. In one implementation, memory 720 is a volatile memory unit. In another implementation, memory 720 is a non-volatile memory unit.

Storage device 730 is capable of providing mass storage one or more security server computers. In one implementation, storage device 730 is a computer-readable medium. In various different implementations, storage device 730 may be a floppy disk device, a hard disk device, an optical disk device, or a tape device.

Input/output device 740 provides input/output operations for system 100, system 200, network 300, or system 600. In one implementation, input/output device 740 includes a keyboard and/or pointing device. In another implementation, input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as a content server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and server computers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Various features that are described in the context of a single implementation can also be implemented in multiple implementations separately or in one or more combinations. Moreover, although features may be described above as acting in certain combinations and even initially claimed as such, other embodiments may include one or more combination of one or more features discussed herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

10.0 Other Aspects of Disclosure

Using the networked computer arrangements, intermediary computer, or processing methods described herein, security in client-server data processing may be significantly increased. Polymorphic techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, are frustrated because object identifiers or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system configured to improve security of one or more server computers interacting with one or more client computers, the system comprising:
one or more processors;
a memory coupled to the one or more processors and storing a set of instructions that define a plurality of detection tests and which, when executed by the one or more processors, cause the one or more processors to:
select, from the plurality of detection tests, one or more first detection tests to be performed by a client computer;
send, to the client computer, a first set of detection instructions that define the one or more first detection tests, and which when executed causes generating a first set of data that identifies a first set of characteristics of the client computer;
receive the first set of data from the client computer;
select, from the plurality of detection tests, one or more second detection tests to be performed by the client computer, wherein the one or more second detection tests are different than the one or more first detection tests;
send, to the client computer, a second set of detection instructions that define the one or more second detection tests, and which when executed causes generating a second set of data that identifies a second set of characteristics of the client computer;
receive the second set of data from the client computer;
select one or more first countermeasures from a plurality of countermeasures based on the first set of characteristics identified in the first set of data and the second set of data;
send, to the client computer, a first set of countermeasure instructions that define the one or more first countermeasures.

2. The computer system of claim 1, wherein:
the first set of characteristics indicates that the client computer is executing an instance of a particular browser;
the one or more first countermeasures are targeted toward the particular browser;
the one or more first countermeasures are associated with the particular browser; and
the one or more first countermeasures are selected based on determining that the one or more first countermeasures are associated with the particular browser.

3. The computer system of claim 1, wherein:
a particular detection test of the one or more first detection tests is associated with at least one of the one or more second detection tests;
the first set of data identifies a particular characteristic of the client computer based on the particular detection test;
the one or more second detection tests are selected in response to determining that the first set of data included the particular characteristic.

4. The computer system of claim 1, wherein the first set of data indicates that the client computer is executing an instance of a particular browser that matches one or more characteristics of a first browser and a second browser;
wherein the computer system further comprises instructions which when executed cause the one or more processors to:
select, from the plurality of detection tests, one or more second detection tests to be performed by the client computer, wherein the one or more second detection tests are associated with the first browser and the second browser, and the one or more second detection tests are different than the one or more first detection tests;
send, to the client computer, a second set of detection instructions that define the one or more second detection tests, and which when executed causes generating a second set of data that identifies a second set of characteristics of the client computer;
receive, from the client computer, the second set of data that identifies the second set of characteristics;
determine, from the second set of characteristics, that the particular browser that is being executed by the client computer is the first browser and not the second browser;
wherein selecting the one or more first countermeasures from the plurality of countermeasures includes selecting at least one countermeasure that is associated with the first browser.

5. The computer system of claim 1, wherein a particular detection test of the one or more first detection tests, detects whether a human user has provided input.

6. The computer system of claim 1, wherein a particular detection test of the one or more first detection tests detects whether the client computer was physically moved.

7. The computer system of claim 1, further comprising instructions which when executed cause the one or more processors to:
receive, from a server computer of the one or more server computers, one or more original instructions to be sent to a browser being executed on the client computer;
send, to the client computer, the one or more original instructions with the first set of countermeasure instructions.

8. The computer system of claim 7, wherein the one or more original instructions are responsive to a request from the browser being executed on the client computer.

9. A method to improve security of one or more server computers interacting with one or more client computers, the method comprising:
selecting, from a plurality of detection tests, one or more first detection tests to be performed by a client computer;
send, to the client computer, a first set of detection instructions that define the one or more first detection tests, and which when executed causes generating a first set of data that identifies a first set of characteristics of the client computer;
receiving the first set of data from the client computer;
select, from the plurality of detection tests, one or more second detection tests to be performed by the client computer, wherein the one or more second detection tests are different than the one or more first detection tests;
send, to the client computer, a second set of detection instructions that define the one or more second detection tests, and which when executed causes generating a second set of data that identifies a second set of characteristics of the client computer;
receive the second set of data from the client computer;
selecting one or more first countermeasures from a plurality of countermeasures based on the first set of characteristics identified in the first set of data and the second set of data;
sending, to the client computer, a first set of countermeasure instructions that define the one or more first countermeasures;
wherein the method is performed by one or more computer processors.

10. The method of claim 9, wherein:
the first set of characteristics indicates that the client computer is executing an instance of a particular browser;
the one or more first countermeasures are targeted toward the particular browser;
the one or more first countermeasures are associated with the particular browser; and
the one or more first countermeasures are selected based on determining that the one or more first countermeasures are associated with the particular browser.

11. The method of claim 9, wherein:
a particular detection test of the one or more first detection tests is associated with at least one of the one or more second detection tests;
the first set of data identifies a particular characteristic of the client computer based on the particular detection test;
the one or more second detection tests are selected in response to determining that the first set of data included the particular characteristic.

12. The method of claim 9, wherein the first set of data indicates that the client computer is executing an instance of a particular browser that matches one or more characteristics of a first browser and a second browser, and the method further comprising:
selecting, from the plurality of detection tests, one or more second detection tests to be performed by the client computer, wherein the one or more second detection tests are associated with the first browser and the second browser, and the one or more second detection tests are different than the one or more first detection tests;
sending, to the client computer, a second set of detection instructions that define the one or more second detection tests, and which when executed causes generating a second set of data that identifies a second set of characteristics of the client computer;
receiving, from the client computer, the second set of data that identifies the second set of characteristics;
determining, from the second set of characteristics, that the particular browser that is being executed by the client computer is the first browser and not the second browser;
wherein selecting the one or more first countermeasures from the plurality of countermeasures includes selecting at least one countermeasure that is associated with the first browser.

13. The method of claim 9, wherein a particular detection test, of the one or more first detection tests, detects whether a human user has provided input.

14. The method of claim 9, wherein a particular detection test, of the one or more first detection tests, detects whether the client computer was physically moved.

15. The method of claim 9, further comprising:
receiving, from a server computer of the one or more server computers, one or more original instructions to be sent to a browser being executed on the client computer;
sending, to the client computer, the one or more original instructions with the first set of countermeasure instructions.

16. The method of claim 15, wherein the one or more original instructions are responsive to a request from the browser being executed on the client computer.

* * * * *